US012087570B2

(12) United States Patent
Traykov

(10) Patent No.: US 12,087,570 B2
(45) Date of Patent: Sep. 10, 2024

(54) METHOD AND SYSTEM FOR FILTERING IONS DEFINED BY A TARGETED CHARGE TO MASS RATIO

(71) Applicants: UNIVERSITE DE STRASBOURG, Strasbourg (FR); CENTRE NATIONAL DE LA RECHERCHE SCIENTIFIQUE, Paris (FR)

(72) Inventor: Emil Traykov, Strasbourg (FR)

(73) Assignees: UNIVERSITE DE STRASBOURG, Strasbourg (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 386 days.

(21) Appl. No.: 17/613,005

(22) PCT Filed: May 23, 2019

(86) PCT No.: PCT/IB2019/001184

§ 371 (c)(1),
(2) Date: Nov. 19, 2021

(87) PCT Pub. No.: WO2020/234621

PCT Pub. Date: Nov. 26, 2020

(65) Prior Publication Data

US 2022/0301846 A1 Sep. 22, 2022

(51) Int. Cl.
*H01J 49/42* (2006.01)
*H01J 49/00* (2006.01)

(52) U.S. Cl.
CPC ...... *H01J 49/4215* (2013.01); *H01J 49/0009* (2013.01); *H01J 49/0031* (2013.01)

(58) Field of Classification Search
CPC . H01J 49/4215; H01J 49/0009; H01J 49/0031
(Continued)

(56) References Cited

U.S. PATENT DOCUMENTS 8,389,929 B2 3/2013 Schoen
8,704,163 B2 4/2014 Schoen
(Continued)

FOREIGN PATENT DOCUMENTS

EP 2 543 059 1/2013
JP 2010092630 A 4/2010
(Continued)

OTHER PUBLICATIONS

International Search Report dated Mar. 3, 2020.
(Continued)

*Primary Examiner* — Kiet T Nguyen
(74) *Attorney, Agent, or Firm* — IPSILON USA, LLP

(57) ABSTRACT

A method of filtering an ion beam to isolate ions having a targeted charge to mass ratio includes providing a quadrupole mass filter device (2), and emitting an ion beam (1') from a source (1) towards a quadrupole mass filter device (2). An electrical field is applied between the rods (3, 3') of each pair of opposite rods (3, 3') of the device (2), each field being defined by combined direct and alternative potentials, calibrating each of the electrical fields in order to create at least one exact focusing point (8) at the exit (5) The method includes generating, by means of rods (3, 3') which are segmented longitudinally, an electrical field extending between and along each pair of segmented rods (3, 3'), and calibrating the local field segments by adjusting the settings of their respective individual DC and AC potentials in order to create at least one intermediate node. An unstable motion region or region of variable stability (10) is created and maintained in the vicinity of and at said at least one intermediate node location.

20 Claims, 23 Drawing Sheets

(58) Field of Classification Search
USPC .......................................................... 250/282
See application file for complete search history.

(56) References Cited

U.S. PATENT DOCUMENTS

| | | | | |
|---|---|---|---|---|
| 8,841,610 | B2 | 9/2014 | Schoen et al. | |
| 2007/0295900 | A1 | 12/2007 | Konenkov | |
| 2014/0306106 | A1* | 10/2014 | Olney | H01J 49/0031 250/282 |
| 2015/0380227 | A1 | 12/2015 | Hotta et al. | |
| 2016/0314950 | A1 | 10/2016 | Smith et al. | |
| 2020/0328073 | A1* | 10/2020 | Peterson | H01J 49/063 |

FOREIGN PATENT DOCUMENTS

| | | | |
|---|---|---|---|
| JP | 2011018470 | A | 1/2011 |
| WO | 2012017548 | A1 | 2/2012 |
| WO | 2017094146 | A1 | 6/2017 |
| WO | 2018211611 | A | 11/2018 |

OTHER PUBLICATIONS

R. F. Lever: "Computation of Ion Trajectories in the Monopole Mass Spectrometer by Numerical Integration of Mathieu 1s Equation" Jan. 1, 1966.

* cited by examiner

METHOD AND SYSTEM FOR FILTERING IONS DEFINED BY A TARGETED CHARGE TO MASS RATIO

RELATED APPLICATION

This application is a National Phase of PCT/IB2019/001184 filed on May 23, 2019 the entirety of which is incorporated by reference.

FIELD OF THE INVENTION

The invention relates to the field of ion filtering, and in particular to the field of ion filtering performed by a quadrupole mass filter, and has as its objects a method of filtering an ion beam implemented by a quadrupole, a scanning method of an ion beam using said method of filtering, a quadrupole mass filter able to perform said method of filtering and a scanning device encompassing said quadrupole.

DESCRIPTION OF RELATED ART

Ion filtering methods using a quadrupole mass filter (QMF) are already known in the state of the art. These methods use the strong dependency between the ions oscillation amplitude inside the quadrupole and their mass. The core components of such a QMF device are four conductive rods, arranged mutually in parallel as two pairs of opposite rods (see FIG. 1). The main principle of operation of QMF is based on the mass-dependent radial confinement of the ions inside the device due to oscillating RF ($V_{RF}$) potentials applied to the QMF rods as shown in FIG. 1. The RF potentials are combined with DC potentials ($U_{DC}$) the increase of which narrows the confined mass range but also limits the transmission for the desired ion mass at high values. So, when the electrical fields inside the quadrupole are calibrated to let certain ions having a given charge to mass (q/m) or a given mass to charge ratio (m/q) go through said quadrupole, another ion having a different ratio injected in said quadrupole will ultimately slam into a rod of the quadrupole or laterally exit it. By varying the targeted mass to charge ratio, it is possible to scan an ion beam passing through a quadrupole to measure its composition.

Examples of such methods are for instance taught in the following documents: EP 2 543 059, U.S. Pat. No. 8,389,929, 8,704,163 or U.S. Pat. No. 8,841,610.

FIGS. 2A and 2B are Mathieu diagrams illustrating graphically the three practical stability regions of a QMF device, the Mathieu parameters being defined by the following equations:

$$\frac{d^2u}{d\xi^2} + (a_u - 2q_u\cos(2\xi))u = 0$$

$$\xi = \frac{\Omega t}{2}$$

$$q_u = \frac{4zV}{mr_0^2\Omega^2}$$

$$a_u = \frac{8zU}{mr_0^2\Omega^2} = 0$$

The typical values of the Mathieu parameters, in standard QMF operation, are $a_{max}\approx 0.237$ and $q_{tip}\approx 0.706$, i.e. near the tip of the stability diagram ($1^{st}$ stability region on FIG. 2A).

However, ions presenting ratios similar to or closely approaching the one for which the quadrupole is calibrated still have a chance to go through it. Indeed, as taught in the above mentioned documents, the considered quadrupole can only be configured to pass an abundance of one or more ion species displaying a mass to charge ratio encompassed in a stability range. Thus, such quadrupoles are not able to be tuned for a unique mass to charge ratio, which leads to a degradation of the quadrupole resolution, defined by the mass of the aimed ratio divided by the mass range of the ions effectively passing through the quadrupole. Furthermore, some of these methods require complex sensors, able to acquire images showing the spatial and temporal properties of the exiting ions, and processing means able to deconvolute the data in the series of ion images to produce a mass spectrum.

To improve the resolution, it is already known to reduce the stability range of the quadrupole by modifying the electrical field features inside it.

For instance, document US 2007/295900 describes a method for processing ions in a quadrupole rod set in which, after having subjected an ion beam to a standard electrical quadrupole field confining ions having mass to charge ratio within a stability region, i.e. inside a certain range comprising mass to charge ratios stable for a given electrical field, an auxiliary excitation field is added to said quadrupole field. This excitation field transforms the stability region into a plurality of smaller stability islands, thus reducing the number of undesired ions exiting the quadrupole.

However, as mentioned above, the excitation field creates a plurality of stability islands. Thus, undesired ions may display mass to charge ratio encompassed in another stability island and may thus be able to go through the quadrupole. Obtaining a good selectivity thanks to this method can then be difficult.

Another known method, mainly applied to monopole mass filters only, and incidentally to dipole mass filters (which are basically and functionally very similar to monopole mass filters) and allowing to use less complex sensors and processing means and to select more precisely the exiting ions, consists in adjusting the electrical field inside the mass filter to create oscillation nodes.

Methods using the properties of oscillation node creation or exact focusing, in relation to monopole and dipole mass filters, are for instance disclosed in "Computation of Ion Trajectories in the Monopole Mass Spectrometers by Numerical Integration of Mathieu's Equation", R. F. Lever; IBM J. Res. Develop., 10 (1966) 26 in "A high-resolution focusing "dipole" mass spectrometer", P. H. DAWSON Int. J. Mass Spectrom., 12 (1973) 53 and U.S. Pat. No. 3,925,662.

However, in these known mass filter devices, the ions are injected at an angle to and/or offset of the longitudinal axis of the monopole or dipole and only a single oscillation node can be created, as the ions always hit one of the planes at the end of the node.

Furthermore, due to their construction and to the usual way of injection of the ions into them (transversally or at an angle), monopole and dipole mass filters can only provide at maximum a 50% analysis efficiency rate, as half of the ions will be lost without being analyzed.

Therefore, the efficiency and resolution of these known devices are not satisfactory and are expected to be improved.

OBJECTS AND SUMMARY

The main aim of the present invention is to overcome these limitations by proposing a filtering method of an ion beam in a mass filter, and a corresponding device, offering a high resolution and an increased mass selectivity, without requiring complex sensors and processing means.

Therefore, the present invention concerns, according to a first of its aspects, a method for filtering an ion beam to isolate ions having a targeted charge to mass ratio, said method comprising:

providing a quadrupole mass filter device comprising four, continuous or segmented, rods, extending parallel to each other from a quadrupole entrance to a quadrupole exit, said rods being arranged symmetrically and regularly around an axis forming a quadrupole longitudinal center axis and defining between them a continuous or segmented tubular volume, said rods being furthermore arranged opposite two by two in respectively a first transverse plane and a second transverse plane, perpendicular to each other, said method being characterized in that it also comprises:

emitting an ion beam towards the entrance of said quadrupole mass filter device, said ion beam being configured by shaping and/or pre-filtering means so as to have a limited radial dimension at least at the level of the entrance and to be directed along the longitudinal center axis of said device, applying an electrical field between the rods or rod segments of each pair of opposite rods, each field being defined by combined direct and alternative potentials, allowing ions having a charge to mass ratio in a given value range, defining a stability range, to oscillate within the lateral limits of the tubular volume or consecutive volume segments when moving through the quadrupole, in both the first and second transverse planes, and to exit said device, and calibrating each of the electrical fields by adjusting the amplitudes of their DC potentials and the amplitudes and frequencies of their AC potentials, and also by adjusting the velocity of the ions entering the quadrupole, in order to create at least one oscillation node or exact focusing point where the oscillation patterns of the ions having said targeted charge to mass ratio, in both transverse planes, substantially and simultaneously cross the quadrupole center axis at a same given point, said node or one of said nodes, called sole or exit node, being located at or proximate to the exit of the device, after the rods or between them.

The invention also encompasses a method of scanning or filtering an ion beam consisting essentially in applying to said ion beam the filtering method as defined and set up before, while gradually modifying the limits of the selected charge to mass ratio range and counting ions exiting the used quadrupole device during a given time period, during which said ratio range is maintained, and correlating the number of exiting ions with said ratio range maintained during said period.

The aforementioned aim is also reached by the invention, according to an other aspect, by means of a quadrupole mass filter device, able to perform the method of filtering an ion beam and to perform the scanning method mentioned before, said device comprising:

four, preferably identical, advantageously cylindrical or hyperbolical, continuous or segmented rods, extending mutually in parallel from an quadrupole device entrance to a quadrupole exit, respectively associated with an entrance aperture and an exit aperture, said rods being arranged symmetrically and regularly around an axis forming a quadrupole center axis and defining between them a continuous or segmented tubular volume, said rods being furthermore arranged two by two in respectively a first transverse plane and a second transverse plane, perpendicular to each other, means to apply specific local electrical fields, defined by combined direct and alternative potentials, between each pair of mutually opposite rods or rod segments of the two pairs of rods, said local fields forming together a composite electrical field along the tubular volume or aligned volume segments, which allows ions having a charge to mass ratio in a given ratio value, defining a stability range, to oscillate within the lateral limits of the tubular volume, or consecutive volume segments, when moving through the quadrupole in both the first and second transverse planes and to exit said quadrupole device, means to adjust the amplitudes of the DC potentials and the amplitudes and frequencies of the AC potentials, means to adjust an acceleration potential designed for providing the ions of an incident beam with a given kinetic energy or velocity before their passage through the entrance of the quadrupole device, wherein said local electric fields are configured and tuned and said acceleration voltage is set, so that at least one oscillation node or exact focusing point is created where the oscillation patterns of the ions having a targeted charge to mass ratio, in both transverse planes, substantially and simultaneously cross the quadrupole center axis at a same point, said node or one of said nodes, called sole or exit node, being located at or proximate to the exit of the device, after the end portions of the rods or between them.

Finally, the invention also concerns a scanning or filtering device able to perform the method of filtering an ion beam and to perform the scanning method mentioned before, said device comprising:

a quadrupole mass filter (QMF) device as mentioned before, an ion source able to emit an ion beam towards the device, means to configure said ion beam before it enters the tubular inside volume of the QMF device, said beam being configured so as to have a limited radial dimension at least at the level of the entrance and to be directed along the longitudinal center axis, said beam being preferably aimed and focused at the quadrupole entrance, namely at the entrance aperture of the entrance electrode of the device, means to apply an adjustable ion acceleration potential between the ion source and the entrance of the quadrupole mass filter device, an ion sensor, for instance a Faraday cup or an electron multiplier, able to emit a signal which is proportionate to the number of ions entering or impacting said sensor during a given time period, said sensor being located beyond the exit of the quadruple mass filter device.

BRIEF DESCRIPTION OF DRAWINGS

The invention will be better understood using the description below, which relates to preferred embodiments, given by way of non-limiting examples and explained with reference to the accompanying drawings, in which:

FIGS. 5 to 8 are simplified schematic representations of various composite (two separate units in FIGS. 5A, 5B and 7/three separate units in FIG. 6) and unitary (FIGS. 8A and 8B) QMF devices according to various alternate constructions of the first and second embodiments of the invention;

DETAILED DESCRIPTION

Figure 1:
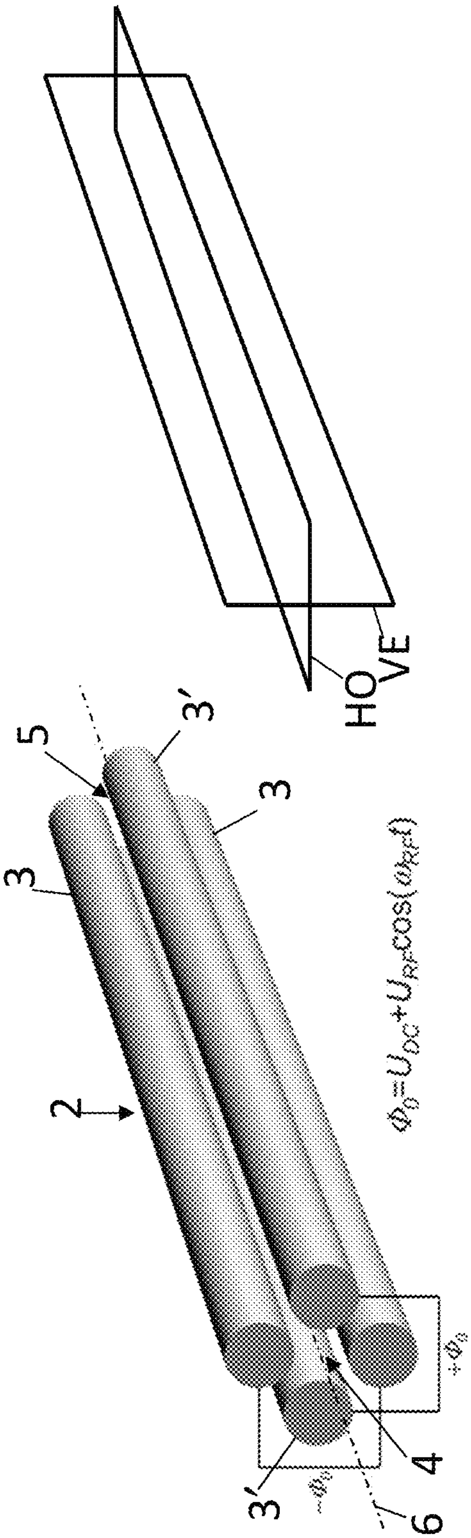
FIG. 1 is a prior art image of a quadrupole mass filter (QMF)

The present invention concerns primarily a method and a device for filtering an ion beam to isolate ions having a targeted charge to mass ratio.

Said the method comprises firstly:

- providing a quadrupole mass filter device 2 comprising four, continuous or segmented, rods 3, 3', extending parallel to each other from a quadrupole entrance 4 to a quadrupole exit 5, said rods 3, 3' being arranged symmetrically and regularly around an axis forming a quadrupole longitudinal center axis 6 and defining between them a continuous or segmented tubular volume 2', said rods 3, 3' being furthermore arranged opposite two by two in respectively a first transverse plane HO and a second transverse plane VE, perpendicular to each other.

According to the invention, said method also comprises the steps of:

- emitting an ion beam 1' towards the entrance 4 of said quadrupole mass filter device 2, said ion beam 1' being configured by shaping and/or pre-filtering means 1", 16, 19 so as to have a limited radial dimension at least at the level of the entrance 4 and to be directed along the longitudinal center axis 6 of said device 2,
- applying an electrical field between the rods 3, 3' or rod segments 7, 7' of each pair of opposite rods 3, 3', each field being defined by combined direct DC and alternative AC potentials, allowing ions having a charge to mass ratio in a given value range, defining a stability range, to oscillate within the lateral limits of the tubular volume 2' or consecutive volume segments 2" when moving through the quadrupole, in both the first and second transverse planes, and to exit said device 2, and
- calibrating each of the electrical fields by adjusting the amplitudes $U_{DC}$ of their DC potentials and the amplitudes $V_{RF}$ and frequencies $F_{RF}$ of their AC potentials, and also by adjusting the velocity of the ions entering the quadrupole 2, in order to create at least one oscillation node or exact focusing point 8, 9 where the oscillation patterns of the ions having said targeted charge to mass ratio, in both transverse planes, substantially and simultaneously cross the quadrupole center axis 6 at a same given point, said node 8 or one 8 of said nodes 8, 9, called sole or exit node, being located at or proximate to the exit 5 of the device 2, after the rods 3, 3' or between them.

Thus, by applying in combination the aforementioned steps, the invention allows to enhance significantly the mass selectivity and increase noticeably the resolution of a QMF device, while maintaining an efficiency much higher than that of a monopole or dipole mass filter.

This achievement results mainly from the specific configuration and orientation of the entering ion beam and the creation of at least one oscillation node.

In a QMF device, such a node is a point where the transverse components of the oscillation of the ions having the desired mass to charge ratio cross simultaneously the quadrupole center axis. Indeed, when the quadrupole mass filter is tuned for a standard mass selection at the tip of the stability diagram for a given m/q (mass to charge ratio), the type and frequencies of the ion oscillations in the two transverse planes are usually very different and the node(s) or focusing point(s) in one transverse plane (sort of partial or half nodes when considering together the two planes) are shifted in relation to the focusing point(s) or node(s) in the other plane. Now, the invention encompasses combinations of RF and DC potentials settings which provide a matching focus in both transverse planes HO and VE, i.e. a spatially matching double focusing (known as "exact focusing"). A calibration or adjusting procedure is thus performed in order to form such a node at least at the quadrupole exit point or near it, thus focusing therein the desired ions. This internal bi-dimensional focusing being strongly mass dependent, only ions displaying a mass to charge ratio comprised in a very narrow band of ratio (centered on the exact desired ratio) are focused at the level of said node.

The configuration (shaping, dimensioning, orienting) of the entering ion beam 1' can be performed in different ways and by using one or several means.

As shown in FIGS. 3A, 3B, 3D and 4 to 8 for example, said ion beam 1', provided by a corresponding source 1, may be passed through a calibrated entrance aperture 16, preferably belonging to an entrance electrode 14 located at or proximate to the quadrupole entrance 4, which shapes and/or filters said beam 1' before it enters the tubular volume 2'.

Alternately, or preferably additionally, said ion beam 1', emitted by a corresponding source 1, may be preconditioned before entering the tubular volume 2' through the entrance 4, in particular in terms of radial size, ion energy and/or direction of travel.

Advantageously, the preconditioning of the ion beam 1' comprises at least focusing said beam 1' near or close to, preferably at, the quadrupole entrance 4.

Preferably, the preconditioning of the ion beam 1' comprises at least, or also, the step of realizing an energy spread filtering of said beam 1' before it passes the quadrupole entrance 4, possibly before it is submitted to focusing.

These preconditioning and filtering measures allow in connection with the beam focusing, to increase considerably the efficiency of mass filtering performed by the QMF device itself.

According to an other important feature of the invention, said method also consists in:

- calibrating the electrical fields in order to create (in addition to the first node 8 located at the exit 5) at least one other node or exact focusing point 9, called intermediate node, located between the entrance 4 and the exit 5 of the device 2,
- filtering the ion beam 1' in the vicinity of and said at least one intermediate node 9 location, through a physical or field based filtering means 10, said filtering means allowing most of the ions having the targeted charge to mass ratio to cross said location and to continue their downstream movement towards the exit 5, the other ions being blocked or caused to collide with one of the rods 3, 3'.

By providing additionally a unique combination of at least one intermediate node 9 and associated filtering means 10, all within a QMF device 2, the invention fulfills in an optimized way the task set forth herein before.

As an ultimate measure to increase the resolution of the filtering method, a final filtering operation of the ion beam 1' may be performed in the vicinity of and at said exit node 8 through a physical filtering means 15, 17, for example an exit electrode plate 15 provided with a calibrated exit aperture 17.

Advantageously, the initial calibration of the electrical fields, in order to obtain any of the oscillation nodes 8, 9 and the settings of the device 2 for a given ions mass, is performed by:

- adjusting the parameters of the electrical fields $U_{DC}$, $V_{RF}$, $F_{RF}$ so that the Mathieu parameters of ions having a given mass to charge ratio are located within or near the tip of a first stability region 11 of the Mathieu stability diagram,
- measuring the distance between a set of half focusing nodes 12, 12' of said ions, corresponding to nodes of one of the transverse oscillation patterns of said ions, by ranging an acceleration potential $U_{ACC}$ which determines the velocity of the ions at the entrance 4 of the device and measuring the variation of the number of ions exiting the quadrupole 2 while crossing the quadrupole center axis 6,
- ascertaining that a given half focusing node 12, 12' corresponds to a node of one of the transverse oscillation patterns of said ions by iteratively varying the frequency $F_{RF}$ and/or the amplitude $V_{RF}$ of the AC potential of the concerned electrical fields and by ranging each time the ion acceleration potential $U_{ACC}$ to measure an offset in the distance between said half focusing nodes 12,
- merging the position of half focusing nodes 12 originating from one transverse oscillation pattern with half focusing nodes 12' originating from the other transverse oscillation pattern by iteratively varying the frequency $F_{RF}$ and the amplitude $V_{RF}$ of the AC potential of the electrical field and checking the position of the half focusing nodes 12, 12' by ranging the acceleration potential $U_{ACC}$, thus creating at least two oscillation nodes 8, 9 corresponding to points or approximately punctual locations where a simultaneous focusing in both transverse planes HO and VE occurs, one node 8 being located at the exit 5 of the device 2 and at least one other node 9 being located between the entrance 4 and the exit 5 of said device 2.

In relation to a simple way of carrying out the invention, one intermediate node 9 with its associated filtering means 10 is provided (see FIGS. 3 to 5, 8A, 13A, 23, 25 and 26).

Nevertheless, in order to increase the selectivity even further, it may be envisaged that the electrical fields between the opposed rods 3, 3' or rod segments 7, 7' are calibrated to form at least two intermediate nodes 9 within the device 2, a corresponding physical or field based filtering means 10 being associated with each intermediate node 9 (see FIGS. 6, 7, 8B, 13C, 14, 15).

As it can be seen from the attached drawings and as explained in more details hereinafter, the specific filtering means 10 may be realized, within the longitudinal inner volume 2', either by addition of a physical element to the QMF device 2 or as a specific local alteration of the electromagnetic environment, around an intermediate node 9.

Moreover, the inventive QMF device 2 can take various forms and show different constitutions.

The following possible constructions, illustrated in the attached drawings, can for example be contemplated:

- a single unitary QMF device with homogeneous continuous rods 3, 3' (see FIGS. 8A, 8B, 25 and 26);
- a single unitary QMF device with segmented rods 3, 3' (see FIGS. 13 to 16, 23 and 24);
- a composite QMF device made of at least two aligned QMF units, mutually abutting or spaced apart longitudinally (see FIGS. 3 to 7).

The distinction between a unitary QMF device with physically segmented rods (FIGS. 13 to 16) and a composite QMF device (FIGS. 3 to 7) can be physically subtle, but functionally obvious (physical filtering means/field based filtering means).

Thus, according to an embodiment of the invention, and as an alternative to a unitary construction, providing the QMF device 2 may consist in aligning and assembling longitudinally end-to-end, or with at least one focusing means 19, 20 being interposed, at least two quadrupole mass filter units, each unit having its own entrance 4 and exit 5, or sharing its entrance 4 and/or exit 5 with an other unit, the filtering of the ion beam 1' being performed by the mutually facing separate or coinciding exit and entrance apertures 16, 17 of the successive quadrupole mass filter units.

Figure 4A:
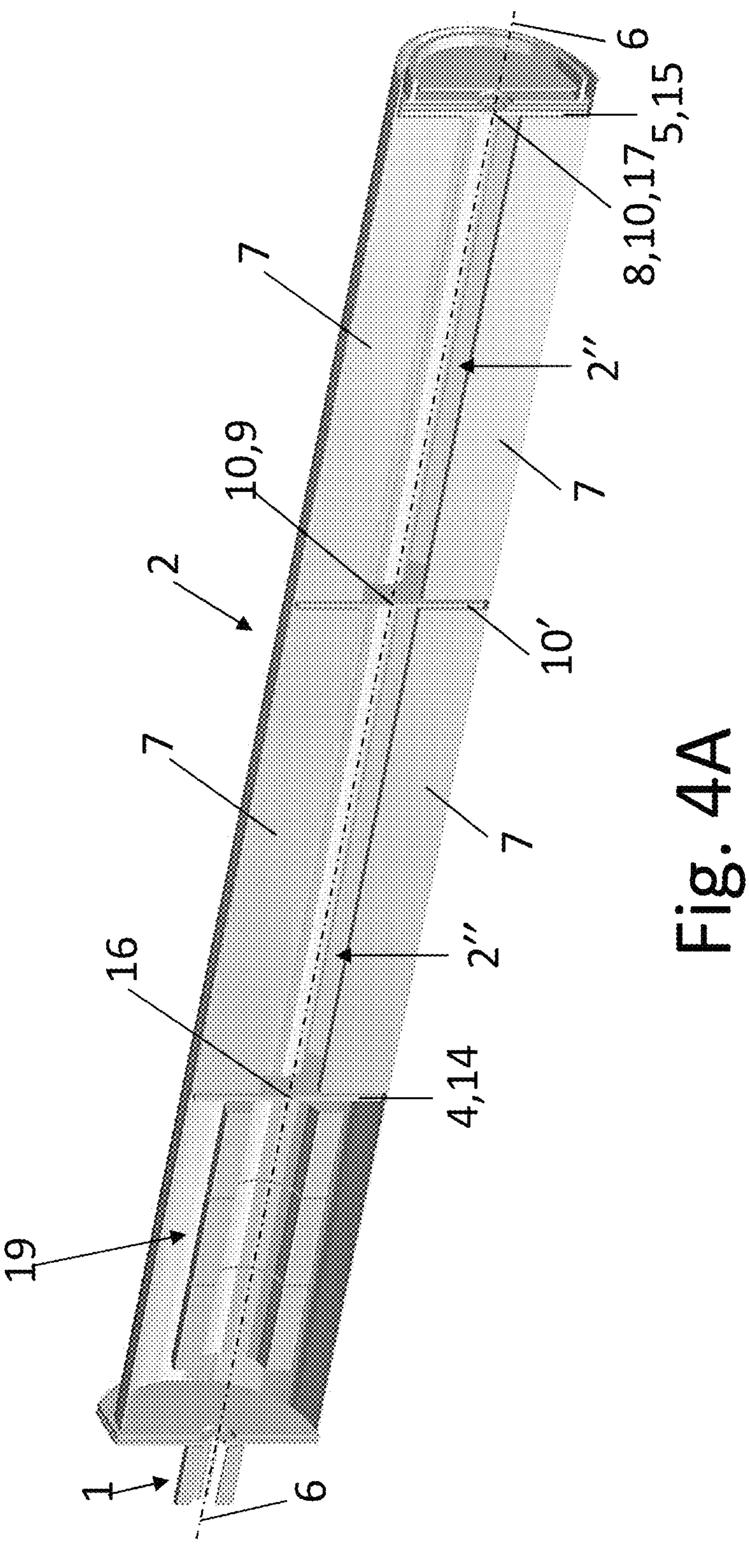
FIG. 4A is an isometric sectional view (along a plane comprising the longitudinal center axis) of a QMF device able to perform the filtering and scanning methods of the invention, said device being composite and comprising two QMF units, according to an example of a second embodiment of the invention.
Figures 4B, 4C, 4D:
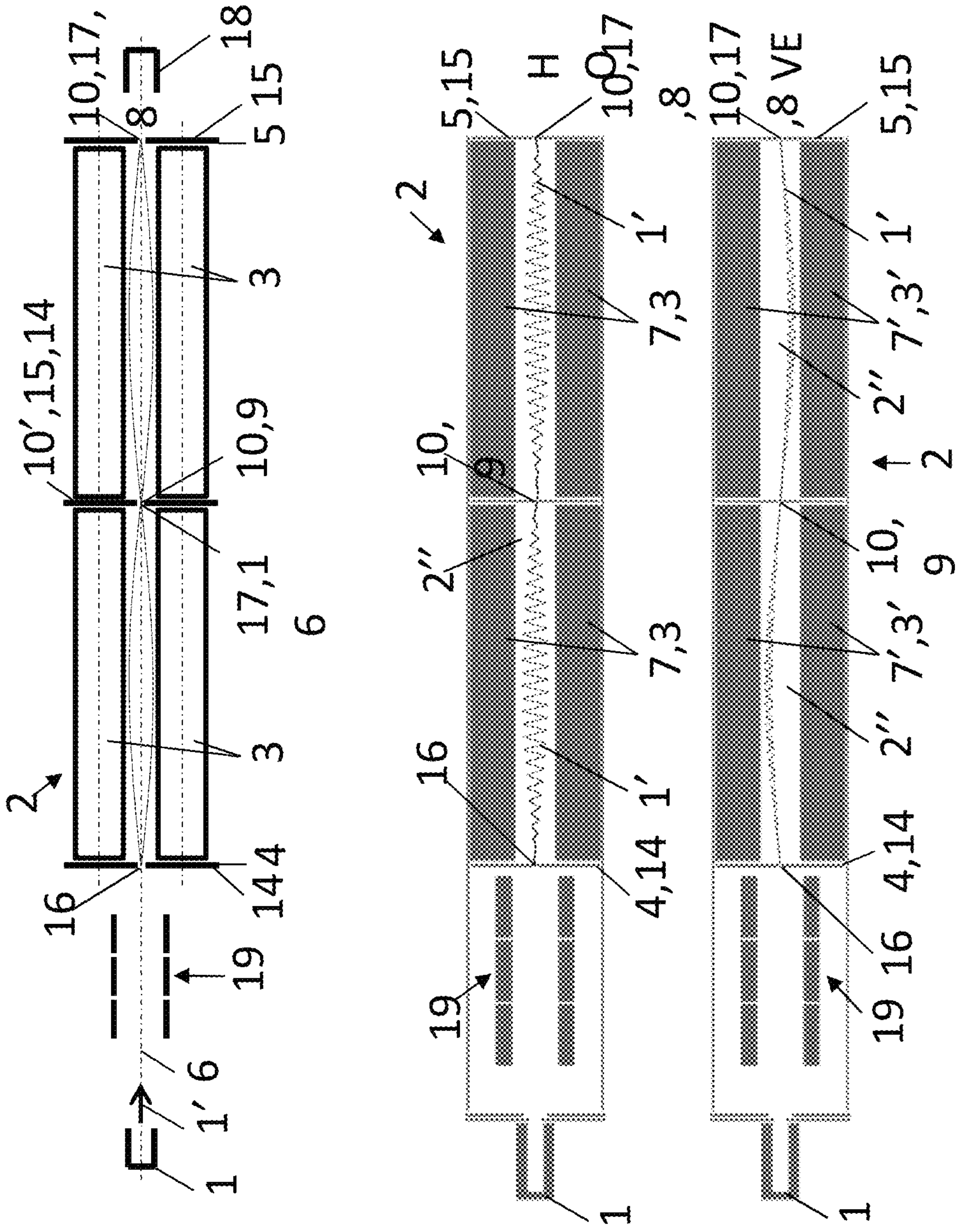
FIG. 4B is a side elevation view of the device shown on FIG. 4A.
FIGS. 4C and 4D are sectional elevation views along the HO and VE planes respectively of the device shown in FIGS. 4A and 4B, exemplary ion trajectories being also shown.
Figure 5A:
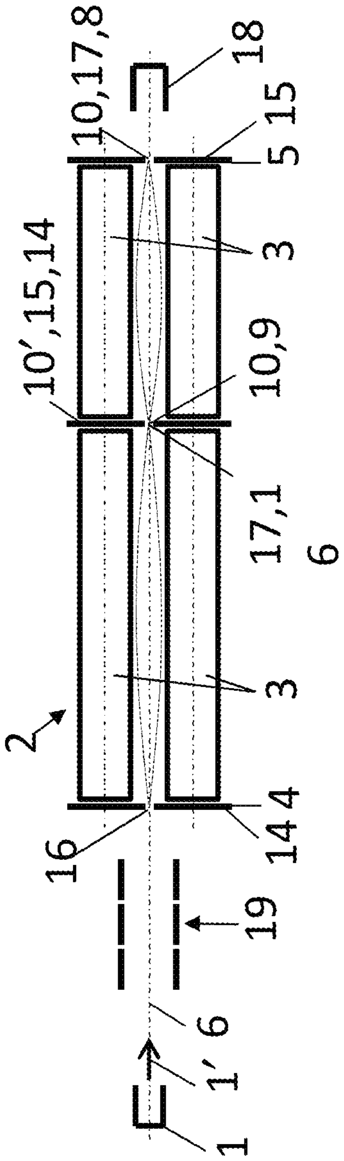
Figure 5B:
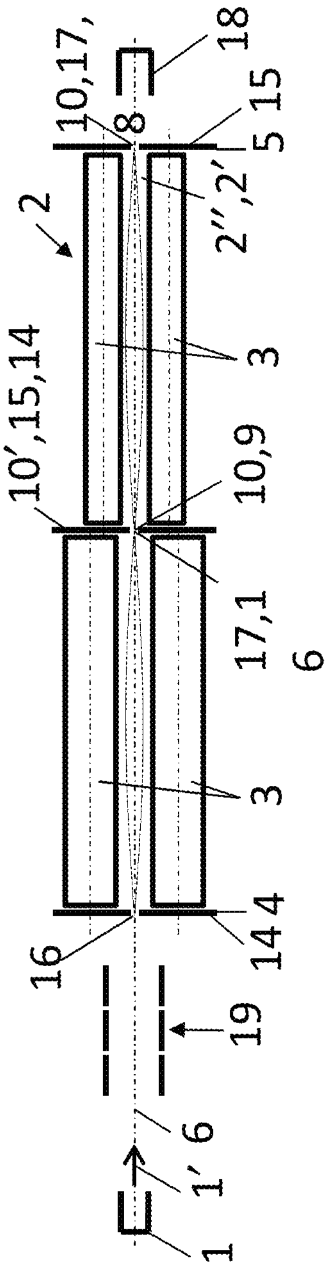
Figure 6:
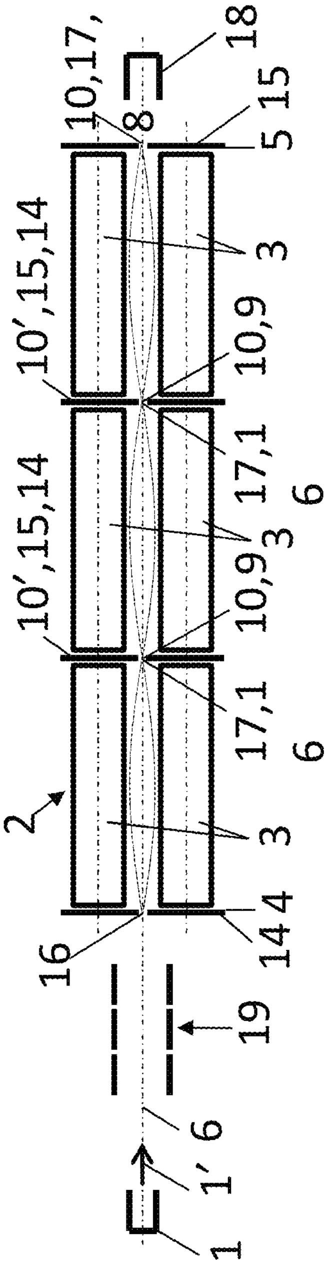
Figures 7, 8A, 8B:
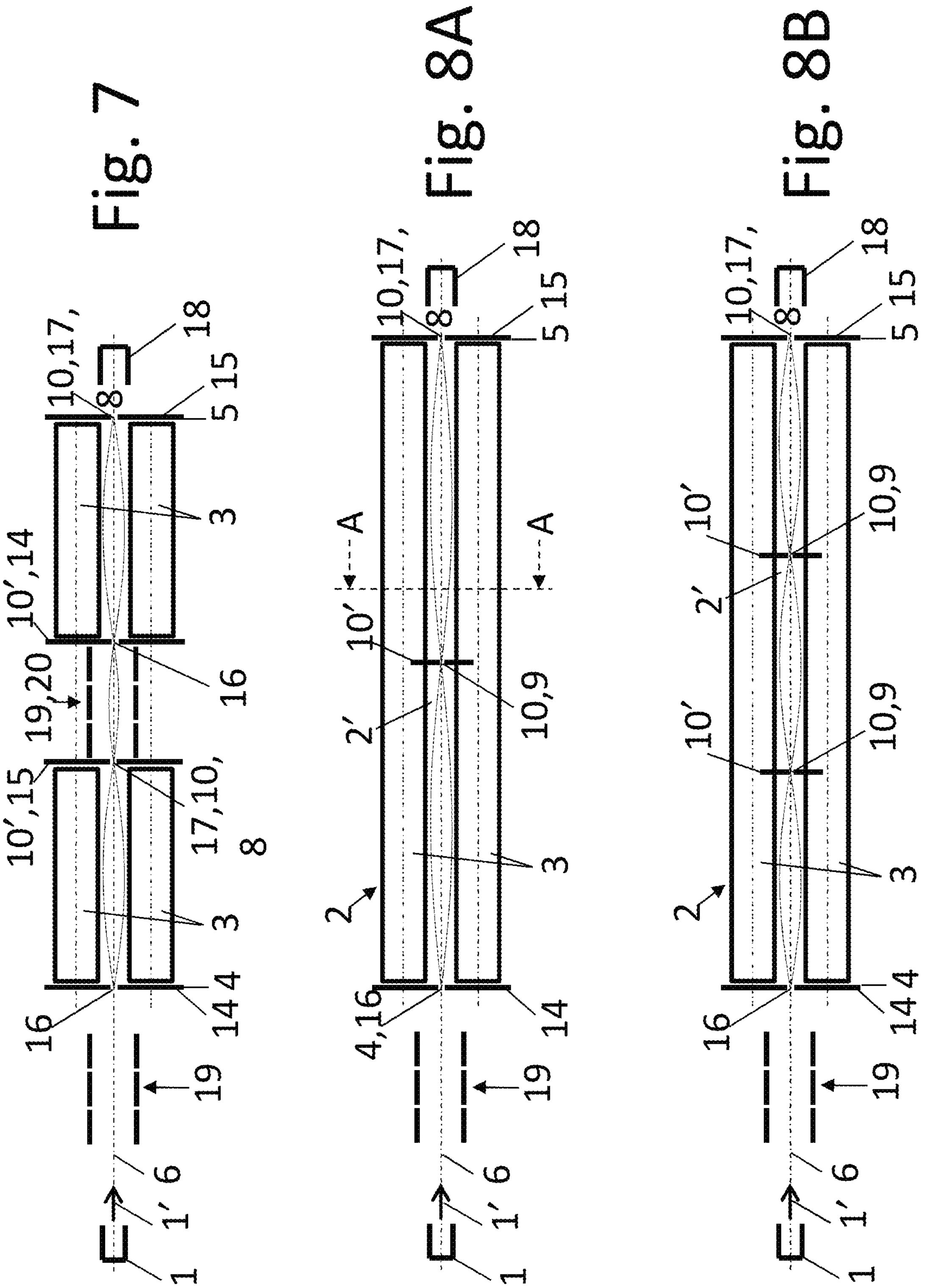
Figure 9:
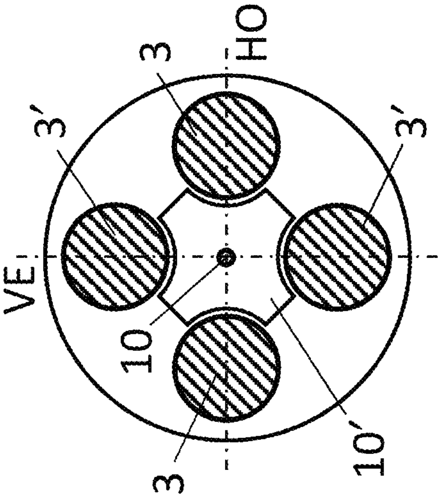
FIG. 9 is a cross-sectional view along the plane A-A of the QMF device of FIG. 8A.

The rods 3, 3' of the different QMF units can be identical (FIGS. 4 and 6), of different lengths (FIG. 5A) and/or of different diameters or distances to the center axis 6 (FIG. 5B).

The ion energy can be modified at the level of the aperture(s) 10 by a DC offset between the consecutive QMF units.

Figure 10:
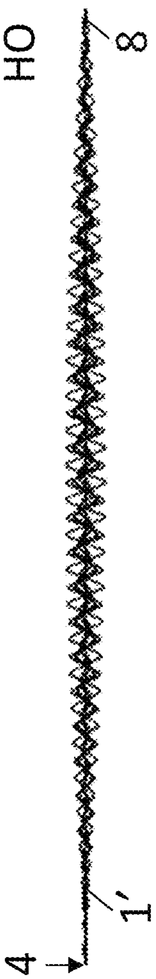
FIGS. 10 and 11 represent various ion trajectories respectively in the HO plane and in the VE plane during tuning of the electrical fields in view of reaching exact focusing at the intermediate and exit apertures.
Figure 11:
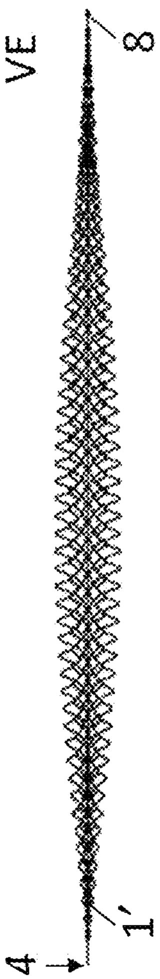
Figure 12:
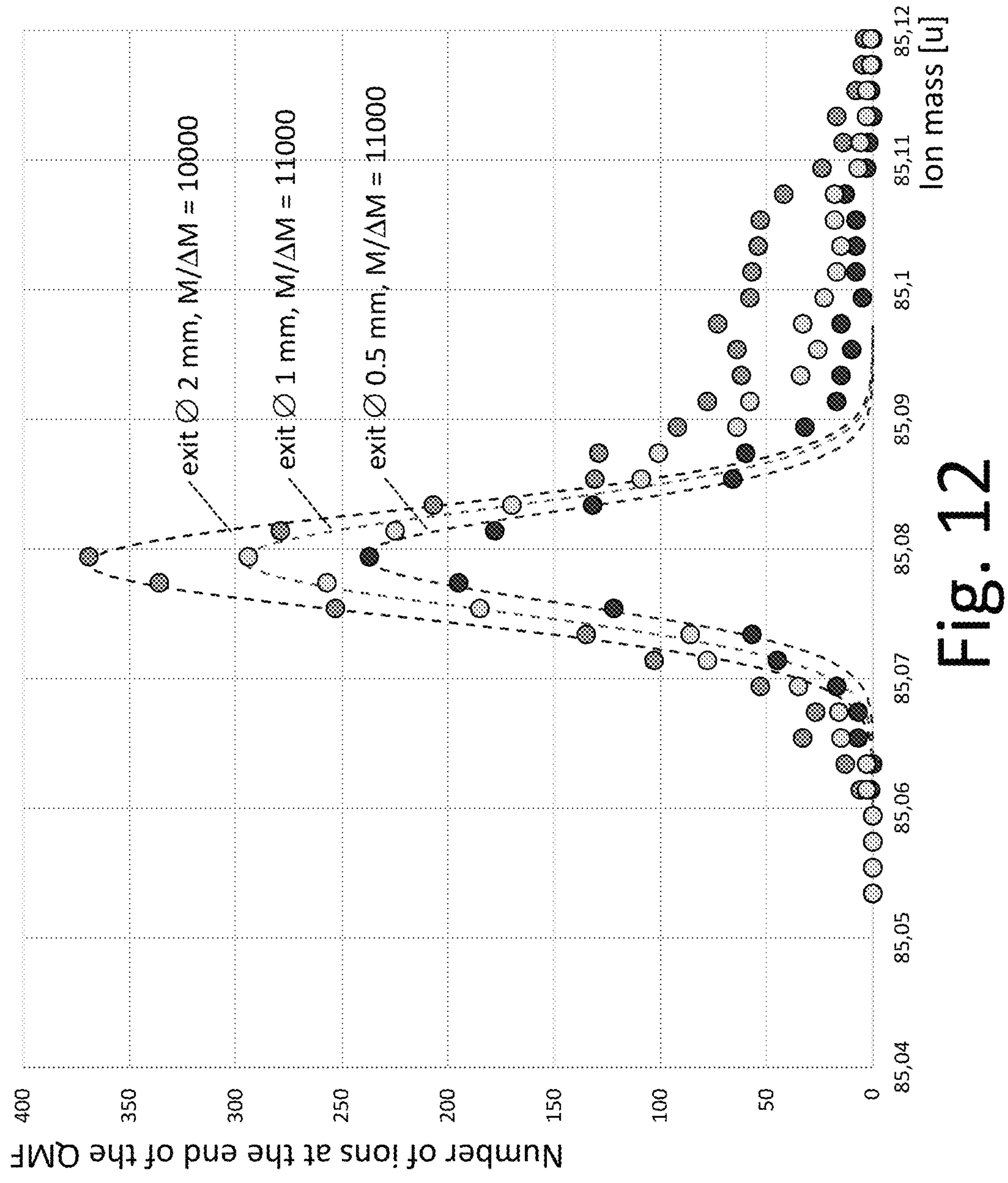
FIG. 12 is a graphic showing, for three different exit aperture diameters, the ion mass vs. the number of ions accounted for at the exit of the QMF device shown in FIG. 3A.
Figure 16:
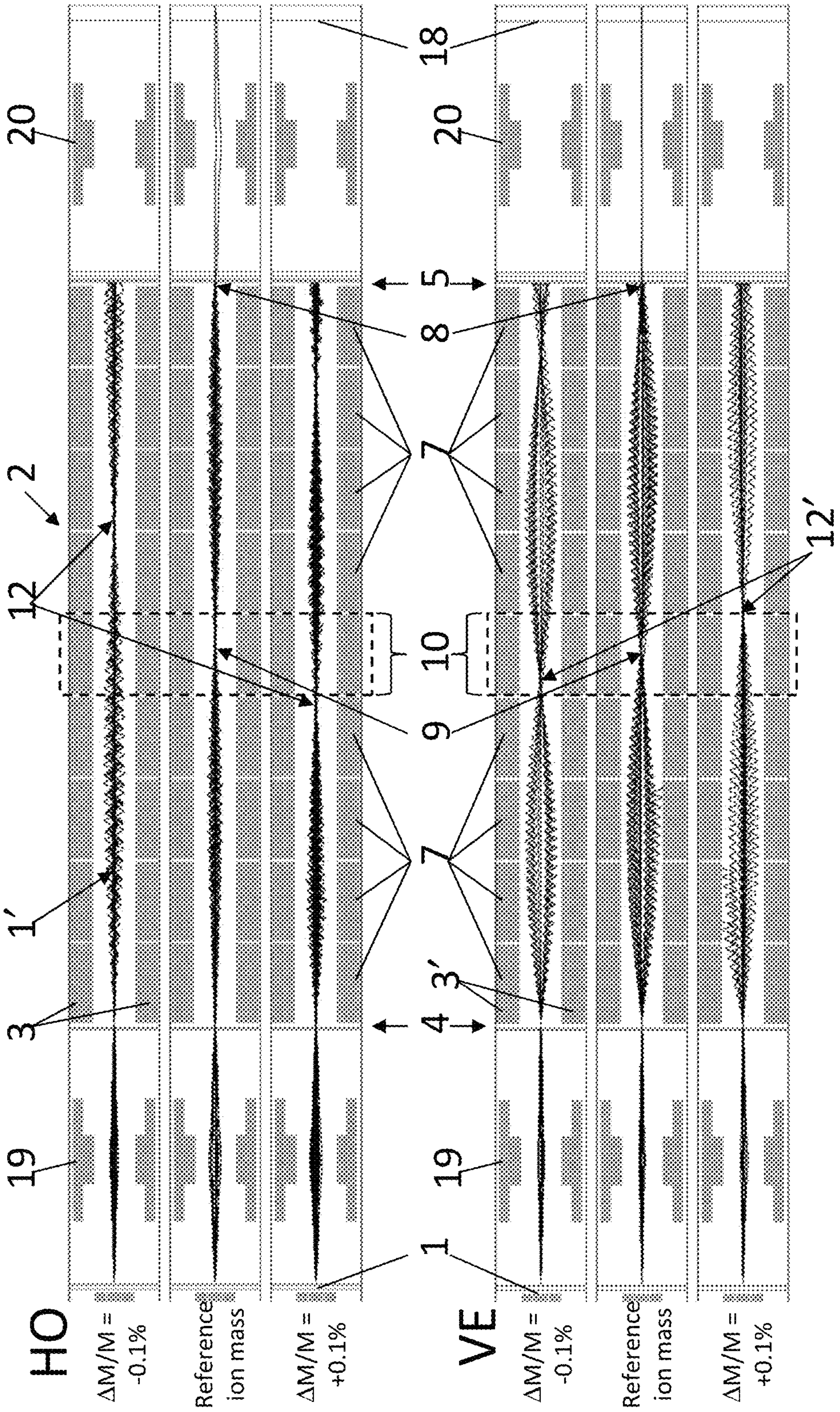
FIG. 16 shows simulation views similar to the views of FIG. 14, illustrating in the horizontal HO plane (the top three views) and in the vertical VE plane (the bottom three views) the effects on a beam of ions with a certain mass dispersion range of the combined enhancements provided by the invention (i.e. exact focusing and unstable motion region)

One can notice on FIGS. 10, 11 and 16, as well as on FIGS. 4C and 4D that the ion trajectory crosses several times the center axis 6 in the HO plane and only once (at the node 9) in the VE plane.

According to a first way of carrying out the internal filtering task of the inventive method, and as shown in FIGS. 3 to 9, the filtering of the ion beam 1' at an intermediate node 9 may be performed by means of at least one calibrated passage 10 in a physical barrier 10', said passage 10 being centered on the considered intermediate node 9, such as for example an aperture 10 in a plate 10' arranged transversally, preferably perpendicular, to the center axis 6 within the tubular volume 2', or within a longitudinal segment 2" of said composite volume 2' of the QMF device, said plate(s) 10' extending radially also between the successive adjacent or separated rod segments 7, 7', if the case occurs.

According to a second way of carrying out the internal filtering task of the inventive method, and as illustrated by way of examples in FIGS. 13 to 16 and 23 to 26, the filtering of the ion beam 1' is performed by creating and maintaining at least one unstable motion region or region of variable stability 10 within the tubular volume 2', or within at least one segment 2" of said composite volume 2', of the QMF device 2, said filtering means being thus formed by region(s) 10 resulting from modification(s) of the local electrical fields.

By applying, in a combined manner, the two improvements consisting in a specific QMF device construction and particular QMF device parameter adjustments (providing conditions for simultaneously realizing exact focusing and creating at least one unstable motion or variable stability region within the QMF internal space), the invention also allows to reach the aim set forth herein before, as with the first inventive proposal.

More precisely, within this second embodiment, the steps of formation of the local electrical fields, formation of at least two focusing nodes 8 and 9 and formation of at least one field based filtering means 10 consist in

- generating, by means of rods 3, 3' which are segmented longitudinally or have a segmented structure in their longitudinal direction, an electrical field extending between and along each pair of segmented rods 3, 3', which comprises several local electrical field segments having their specific calibration settings for the DC and/or the AC potential(s) and corresponding to the respectively mutually opposed segments 7, 7' of the segmented rods 3, 3',
- calibrating said local field segments by adjusting the settings of their respective individual DC and AC potentials in order to create at least one other node or exact focusing point, called intermediate node 9, located between the entrance 4 and the exit 5 of the device 2, the at least one intermediate node 9 being substantially located in the center of one of the local electrical field segments,
- creating and maintaining an unstable motion region or region of variable stability 10 in the vicinity of and at said at least one intermediate node 9 location, by modifying the settings of the local electrical fields applied to the rod segments 7, 7' surrounding said region, in order to impart unstable or at least altered trajectories to every ion passing through said region 10, the length of said unstable motion or variable stability region 10 being set so that most ions having said targeted charge to mass ratio are able to cross said region 10, to return to a stable oscillation and continue their downstream movement towards the exit 5.

The electrical fields may be calibrated to form at least two intermediate nodes 9 inside the device 2, which are located respectively in the center of a local electrical field portion, an unstable motion region or region of variable stability 10 being created in the vicinity of and at the location of at least one of said intermediate nodes 9, preferably in the vicinity of and at the locations of all intermediate nodes 9.

When a plurality of nodes 9 are present inside the device 2, it may also be envisaged that unstable motion regions 10, or intermediate filtering apertures 10, are associated/combined with only some of said nodes 9, depending on the desired properties of the device 2.

Figure 22A:
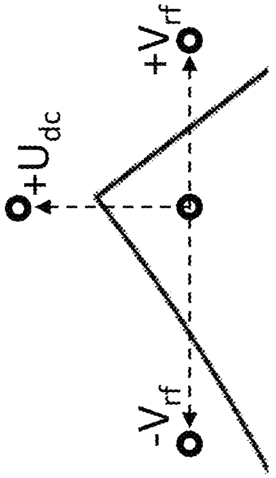
FIG. 22A is a schematic diagram of the tip of the stability diagram of FIG. 2B, showing the two ways of achieving a motion instability (UMR), i.e. by varying $U_{DC}$ or $V_{RF}$.

Real motion instability, creating an UMR region 10, can be achieved, as shown on FIG. 22A, by increasing $U_{DC}$ or by decreasing $V_{RF}$. If $V_{RF}$ is increased it is possible to cross the stability line too, but in this case, the QMF tuning will remain in stability for all masses higher than the reference mass, which makes this second approach less favorable.

Thus, according to a first alternative of the invention, the step of creating and maintaining an unstable motion (or variable stability) region 10 is carried out by increasing the DC potential applied to each segment 7, 7' surrounding said region 10, said increase of the DC potential being selected by taking into account the length of the unstable motion region 10, determined by the segmentation configuration of the rods 3, 3', so that most ions having said targeted charge to mass ratio are able to cross said region 10 and to return to a stable, radially confined oscillation and continue their downstream movement towards the exit 5.

According to a second alternative of the invention, or alternatively to a supplemental feature of the invention according to the first embodiment, the step of creating and maintaining an unstable motion (or variable stability) region 10 is carried out by modifying the amplitude and/or the offset of the AC potential, possibly in addition to an increase of the DC potential, which is (are) applied to each segment 7, 7' surrounding said region 10, said change(s) of the AC, and possibly DC, potential(s) being adjusted by taking into account the length of the unstable motion region 10, determined by the segmentation configuration of the rods 3, 3', so that most ions having said targeted charge to mass ratio are able to cross said region 10 and to return to a stable, radially confined oscillation and continue their downstream movement towards the exit 5.

Figure 13A:
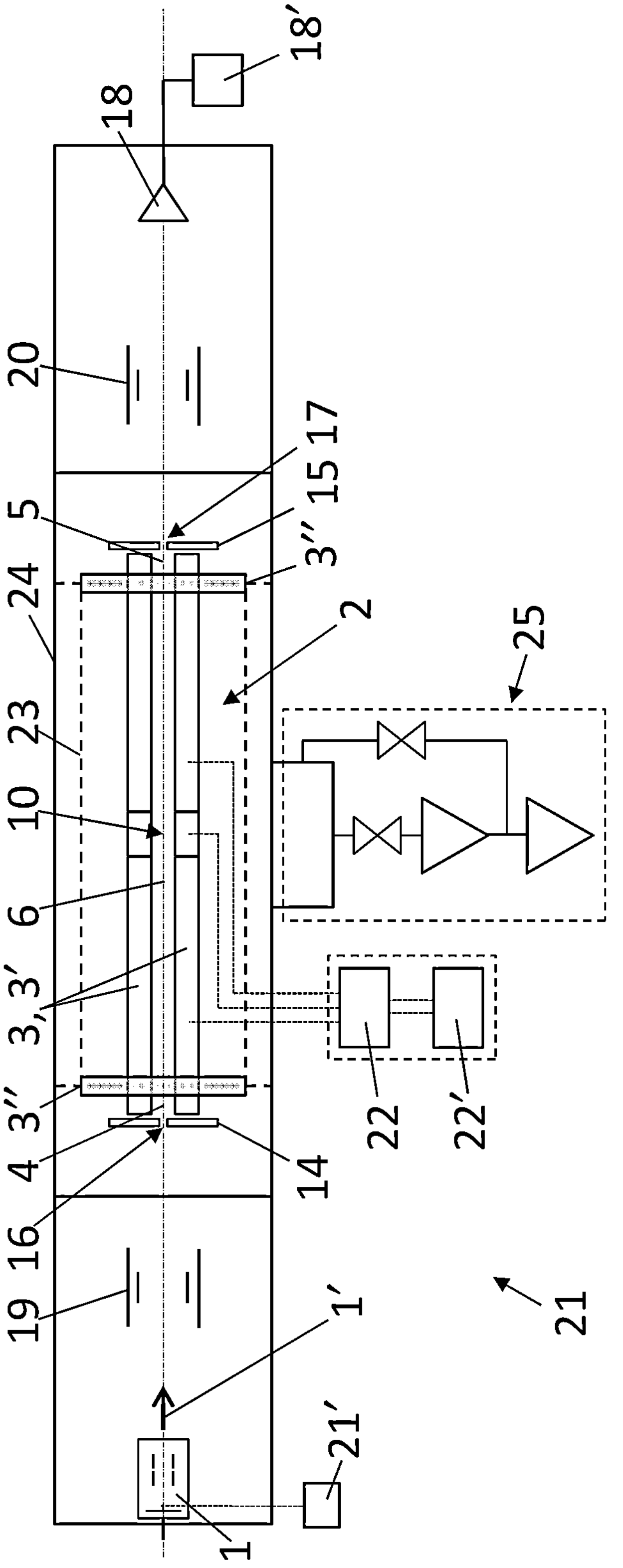
FIG. 13A is a schematic representation of a scanning or filtering device according to an embodiment of the invention, able to perform the filtering and scanning methods according to the invention and comprising a QMF device having physically segmented rods (here with three segments)
Figure 13B:
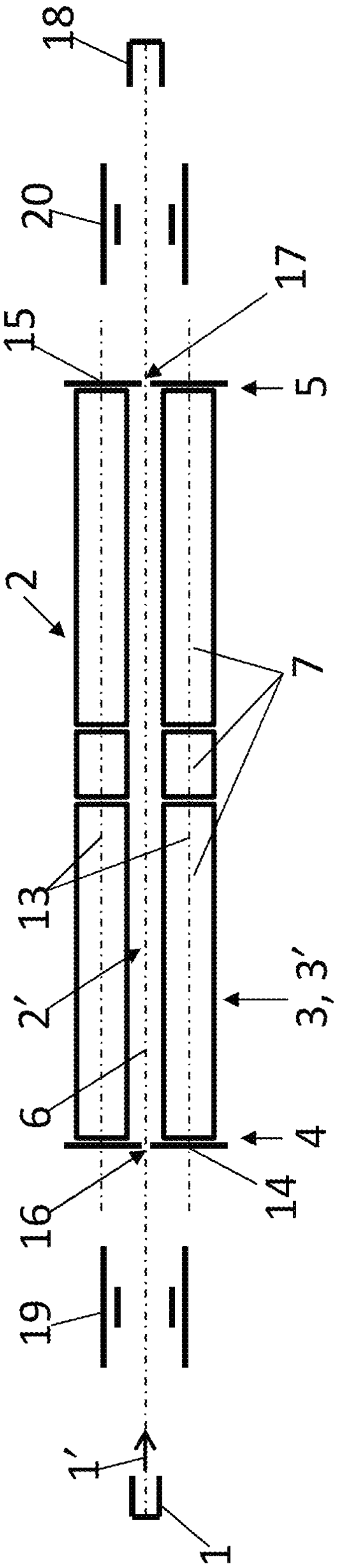
FIG. 13B is a schematic representation of the QMF device forming part of a scanning or filtering device as shown on FIG. 13A.
Figure 13C:
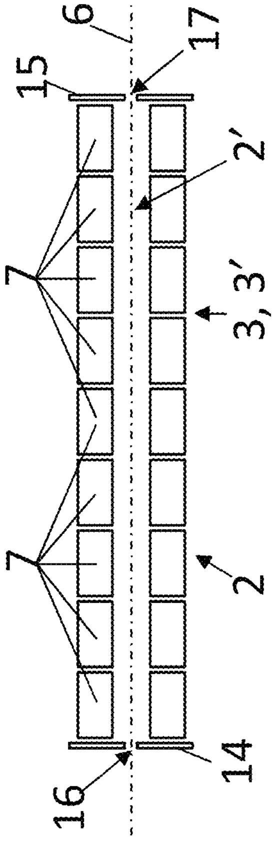
FIG. 13C is a schematic representation of a QMF device according to an alternate construction of the first embodiment of the invention, having rods comprising nine longitudinal segments.

In relation to these two previous alternate proposals in relation to the inventive method, it can be envisaged that each of the segmented rods 3, 3' of at least one pair of rods is made of physically separated segments 7, 7' mutually aligned in a direction parallel to the longitudinal center axis 6, the or each unstable motion region 10 being preferably achieved by varying $U_{DC}$ or by varying $V_{RF}$ of the concerned opposed segments 7 (FIGS. 13B and 13C). Thus, each rod 3, 3' is formed by individual immediately adjacent segments 7.

Figure 2B:
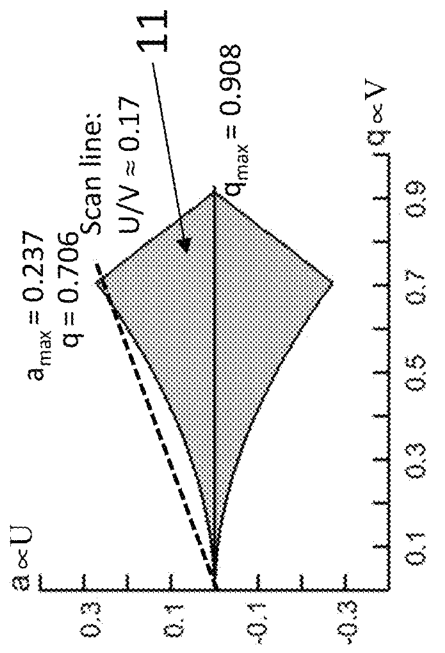
FIGS. 2A and 2B are Mathieu diagrams graphically illustrating the three practical stability regions of a prior art QMF device.
Figure 2A:
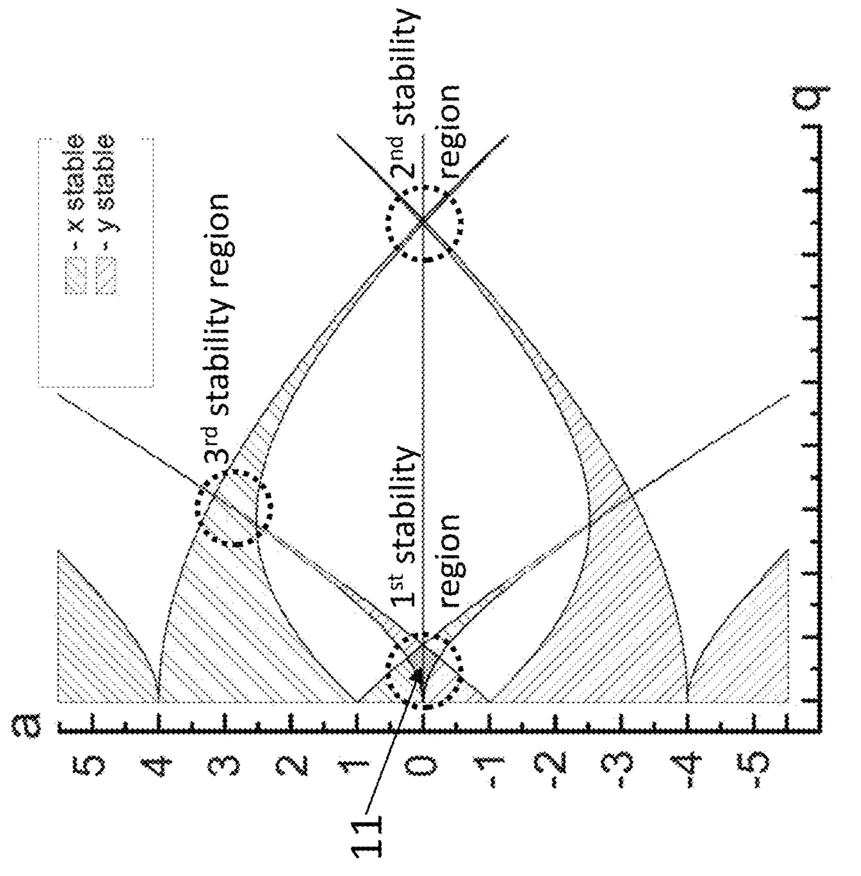
Figure 22B:
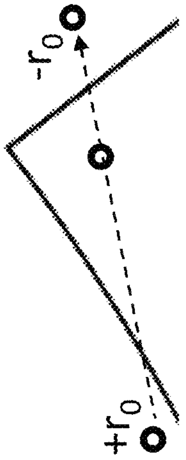
FIG. 22B is a schematic diagram showing how the stability can be affected by reducing/increasing the distance between the center line of the quadrupole and its constitutive rods.

Alternatively, and as shown on FIG. 22B, stability can be also affected by reducing/increasing the distance $r_O$ between the beam axis (center line axis 6) and the rods, but again the QMF tuning will correspond to a stability for higher/lower masses. In fact, the reduction/increase of $r_O$ will follow the mass scan line (FIG. 2B), which makes this approach less suitable for increasing the selectivity of the QMF device 2.

Figure 23:
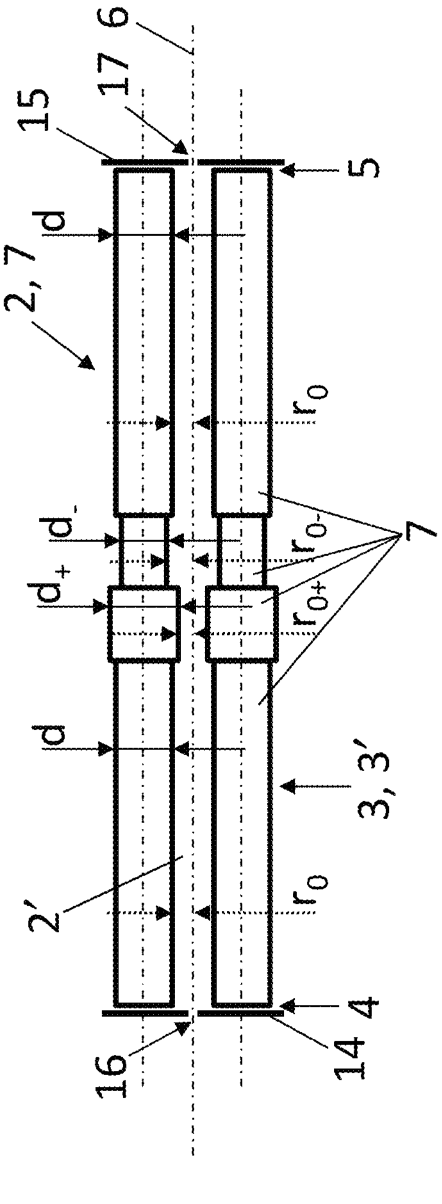
FIG. 23 is a side view of a pair of opposite segmented rods according to an alternate construction in comparison to the embodiments of FIGS. 13B and 13C.

With respect to this second alternate construction, it can be envisaged that each of the segmented rods 3, 3' of at least one pair of rods consists of a rod having at least two longitudinal contiguous segments 7, 7' showing distances $r_O$, $r_{O-}$, $r_{O+}$ to the longitudinal center axis 6 which are different (FIG. 23).

Preferably, each rod 3, 3' comprises segments 7, 7' of different diameters, in particular at least two neighboring segments having diameters $d_-$, $d_+$ which are different from the current diameter d of the rod 3, 3', said at least two neighboring segments having one a greater and the other a smaller diameter being located in an area where an unstable motion region 10, or at least a region of variable stability, is to be achieved. Thus, each rod 3, 3' is a one-piece element of variable diameter by zone along its longitudinal axis.

Although $r_O$ distance modification alone may not be sufficient for the formation of effective UMRs, there is a possibility to achieve a similar filtering by adding two consecutive modifications ($r_{O+}$, $r_{O-}$) as shown in FIG. 23.

This illustrated example makes consequently a high-pass and a low-pass mass filtering.

Figure 14:
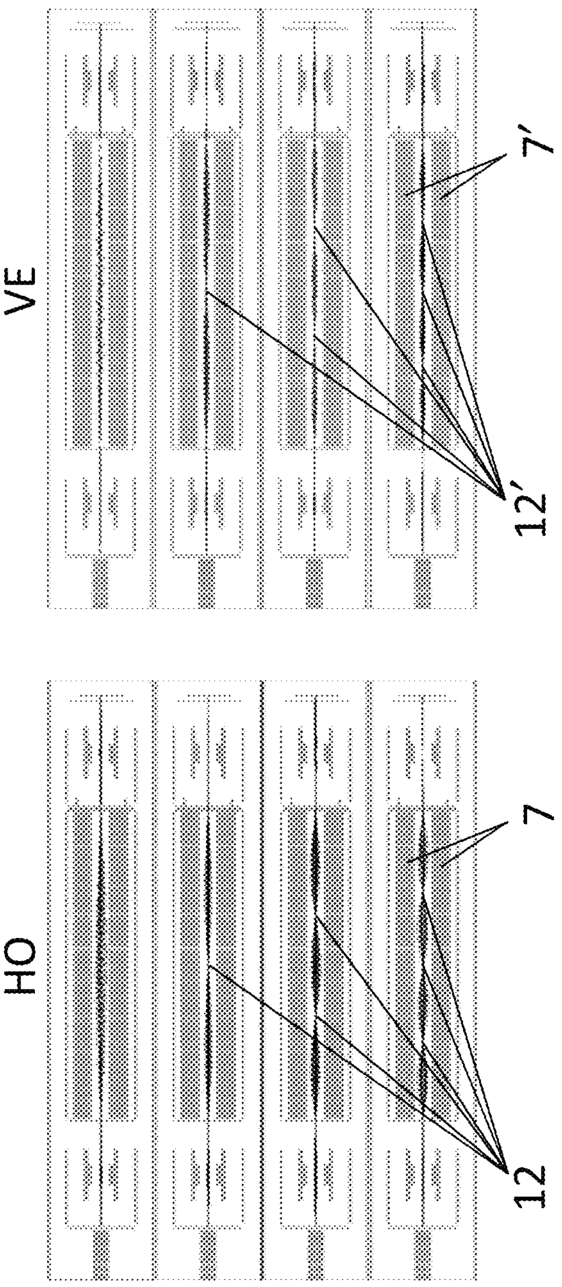
FIG. 14 shows simulation views illustrating the ion trajectories respectively in the horizontal HO plane (the four left views) and in the vertical VE plane (the four right views), with each row of views corresponding to a given set of parameter values ($F_{RF}$, $V_{RF}$, and $U_{DC}$) and a given $U_{ACC}$ scanning range.
Figure 15:
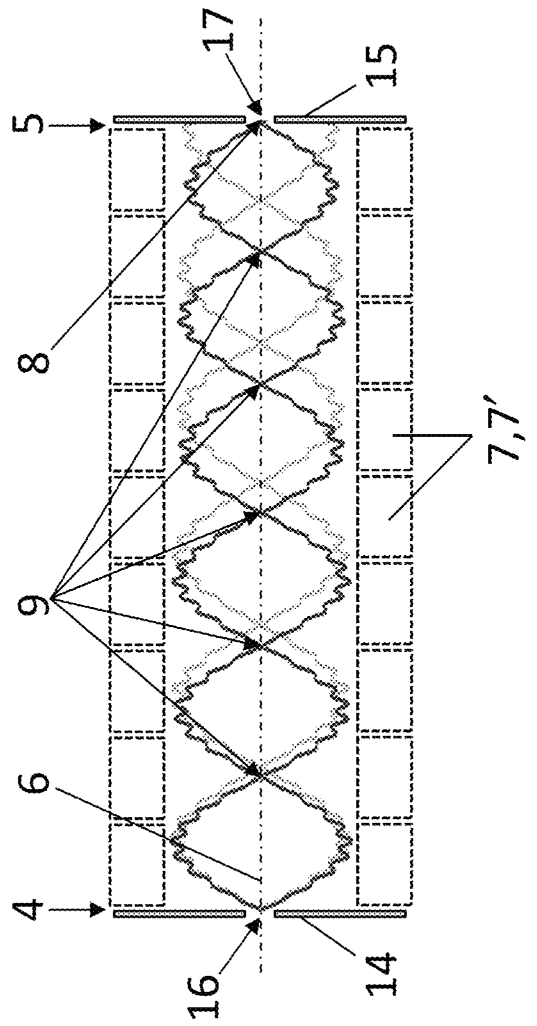
FIG. 15 is a graphical representation of two oscillation trajectories in one transverse plane (HO or VE) for ions with similar properties (q/m, energy, . . . ), showing the nodes of the oscillatory motion of two types of ions along a QMF device as shown in FIG. 13C.
Figure 24:
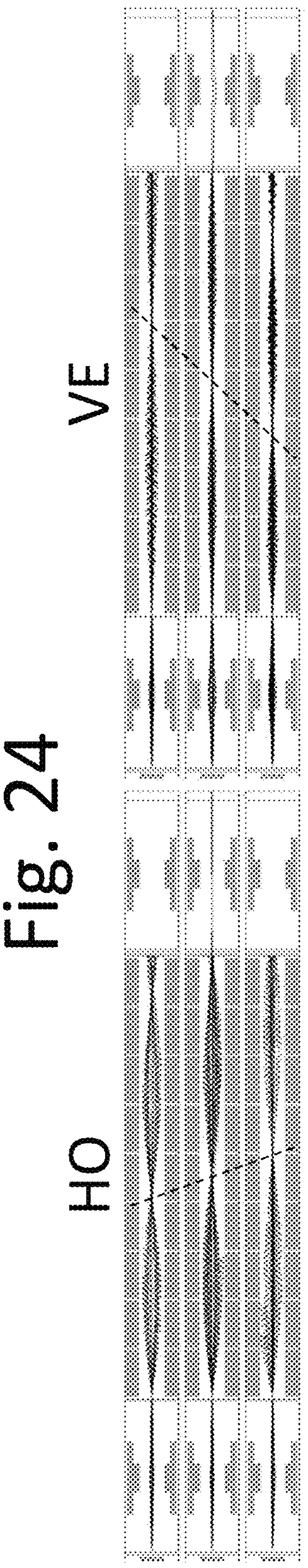
FIG. 24 are simulation views similar to the ones of FIG. 16, showing the displacement of the oscillation nodes in the HO and VE planes during the adjusting of the DC and AC potentials in order to create an intermediate exact focusing point.

FIG. 24 illustrates, as do FIGS. 14 and 16, the node dependence on ion mass (the middle panels are for the reference mass, the top panels are −0.1% of the reference mass and the bottom panels are +0.1% of the ion mass.

Yet another possibility to filter unwanted masses, in the inner node region or in the central node region (by creating a region of instability) may be obtained by equipping the QMF device (having segmented rods or traditional—unsegmented—rods) with additional pairs of opposed DC electrodes 26, 26' aligned at the planes of symmetry of the arrangement of rods of the QMF device of FIG. 1 (i.e. arranged in concurrent bisector planes of HO and VE).

Figure 25:
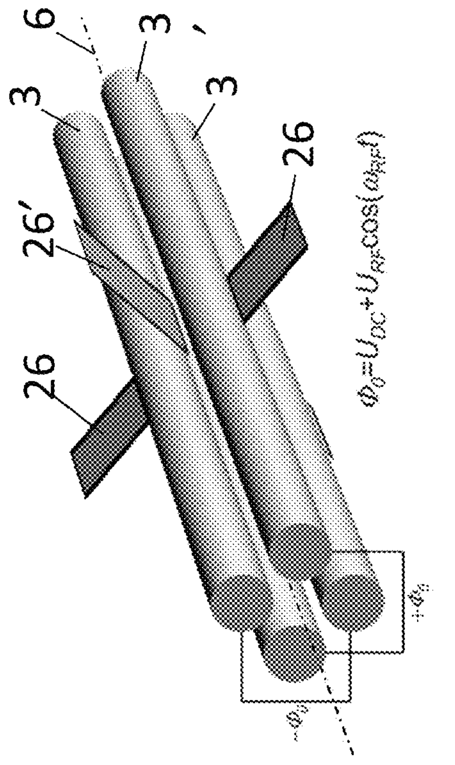
FIG. 25 is a simplified perspective view of the four rods of an other possible embodiment of the QMF device of the invention, and, FIG. 26 is a view in the direction of its longitudinal axis of the device shown in FIG. 25.
Figure 26:
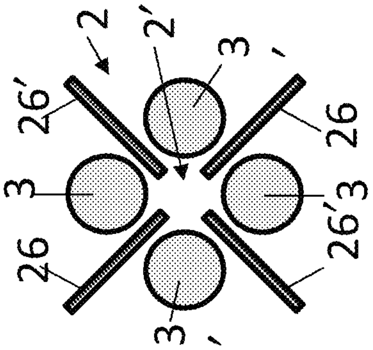

Thus, as illustrated on FIGS. 25 and 26, the step of creating and maintaining an unstable motion region or region of variable stability 10 can be carried out by modifying the local electrical fields by means of at least one pair of opposed DC electrodes 26, 26' aligned in the planes of symmetry of the arrangement of rods 3, 3' of the QMF device 2, i.e. along the concurrent bisector planes of the first and second transverse planes HO and VE.

In relation to another feature of the invention, the location(s) of the node(s) 8, 9 may also be adjusted by modifying the parameters $U_{DC}$, $V_{RF}$, $F_{RF}$ of the local electrical fields and/or the acceleration potential $U_{ACC}$, as the potential difference between the ion source 1 and the electrode at the entrance 4 of the device 2.

If the case occurs, the method may further comprise a step of compensating potential mechanical imperfections of the device 2, for instance a position offset of a rod center axis 13 or a difference in a radius of the rods 3, 3', by applying DC and/or AC correction potentials to said quadrupole rods 3, 3'.

In accordance with another aspect of the invention a method of scanning an ion beam is proposed, which consists essentially in applying to said ion beam the filtering method as defined and set up herein before, while gradually modifying the limits of the selected charge to mass ratio range and counting ions exiting said quadrupole 2 during a given time period, during which said ratio range is maintained, and correlating the number of exiting ions with said ratio range maintained during said period.

In relation to a first practical embodiment of the invention, the limits of the stability range are modified by varying, preferably ramping up and down the frequency $F_{RF}$ of the AC potentials of the electrical fields existing between the two opposite rods of each pair of rods 3, 3'.

In relation to a second practical embodiment of the invention, the limits of the stability range are modified by ramping the amplitudes $V_{RF}$, $U_{DC}$ of the AC and DC potentials of the electrical fields and by readjusting the locations of the nodes 8, 9 thanks to a variation, preferably a ramping up and down, of the acceleration potential $U_{ACC}$ of the ions at the entrance 4 of the device 2, the frequency value of said electrical fields being advantageously switched stepwise to another frequency value each time the acceleration potential $U_{ACC}$ reaches a value leading to a given decrease of the filtering performance, and the ramping of the potentials $V_{RF}$, $U_{DC}$, $U_{ACC}$ restarted.

Advantageously, the scanning method can comprise two successive scanning phases, namely a preliminary fast and simple standard operation with a lower resolution, followed by frequency scan with a higher resolution in the identified regions of interest. This allows to avoid the difficulty to maintain the $V_{RF}$ constant for a large range of frequencies (which are necessary for a wide mass range scan), which is delicate to achieve even with expensive high-precision electronics.

Thus, according to an embodiment of the invention, in a first scanning phase, the limits of the stability range are modified by ramping the amplitudes $V_{RF}$, $U_{DC}$ of the AC and DC potentials of the electrical fields and, in a second scanning phase, after having identified the regions of interest from the results of the first scanning phase, a scanning is performed within said regions by varying, preferably ramping up and down, the frequency $F_{RF}$ of the AC potentials.

According to another aspect of the invention, and as shown on FIGS. 3 to 8 and 13, a quadrupole mass filter device 2, able to perform the method of filtering an ion beam and to perform the scanning method as described before, is proposed.

Said device 2 comprises:

four, preferably identical, advantageously cylindrical or hyperbolical, continuous (homogenous) or segmented rods 3, 3', extending mutually in parallel from a quadrupole device entrance 4 (with an aperture 16) to a quadrupole device exit 5 (with an aperture 17), said rods 3, 3' being arranged symmetrically and regularly around an axis forming a quadrupole center axis 6 and defining between them a continuous or segmented tubular volume 2', said rods 3, 3' being furthermore arranged two by two in respectively a first transverse plane HO and a second transverse plane VE, perpendicular to each other, means to apply specific local electrical fields, defined by combined direct DC and alternative AC potentials, between each pair of mutually opposite rods 3, 3' or rod segments 7, 7' of the two pairs of rods 3, 3', said local fields forming together a composite electrical field along the tubular volume 2' or aligned volume segments 2", which allows ions having a charge to mass ratio in a given ratio value, defining a stability range, to oscillate within the lateral limits of the tubular volume 2', or consecutive volume segments 2", when moving through the quadrupole 2 in both the first and second transverse planes HO, VE and to exit said quadrupole device 2, means to adjust the amplitudes $U_{DC}$ of the DC potentials and the amplitudes $V_{RF}$ and frequencies $F_{RF}$ of the AC potentials, means to adjust an acceleration potential $U_{ACC}$ designed for providing the ions of an incident beam 1' with a given kinetic energy or velocity before their passage through the entrance 4 of the quadrupole device 2.

Furthermore, said local electric fields are configured and tuned and said acceleration voltage is set, so that at least one oscillation node or exact focusing point 8, 9 is created where the oscillation patterns of the ions having a targeted charge to mass ratio, in both transverse planes HO, VE, substantially and simultaneously cross the quadrupole center axis 6 at a same point, said node 8 or one 8 of said nodes 8, 9, called sole or exit node, being located at or proximate to the exit 5 of the device 2, after the end portions of the rods 3, 3' or between them.

According to a preferred embodiment of the invention, said local electrical fields are configured and tuned and said acceleration voltage is set, so that:

at least two oscillation nodes or exact focusing points 8, 9 are created where the oscillation patterns of the ions having a targeted charge to mass ratio, in both transverse planes HO, VE, substantially and simultaneously cross the quadrupole center axis 6 at a same point, said nodes 8, 9 comprising:

one oscillation node or exact focusing point 8 located at the exit 5 of the device 2, at least one other intermediate oscillation node or exact focusing point 9 located between the entrance 4 and the exit 5 of the device 2.

Furthermore, also according to said preferred embodiment of the invention, filtering means 10 are provided, in the vicinity of and at said at least one intermediate node 9, in order to filter the ion beam 1', said filtering means 10 being either physical or field based means and being arranged and configured so as to allow most of the ions having the targeted charge to mass ratio to cross said location and to continue their downstream movement towards the exit 5, the other ions being blocked or caused to collide with one of the rods 3, 3'.

In its simplest embodiment, the QMF device 2 comprises one intermediate node 9 with an associated filtering means 10.

Now, the invention can also provide that the electrical fields between the opposed rods 3, 3' or rod segments 7, 7' be calibrated to form at least two intermediate nodes 9 within the device 2, a corresponding physical or field based filtering means 10 being associated with each intermediate node 9.

Advantageously the ion beam filtering means associated with the first or exit node 8 consists of a physical filtering means 15, 17, for example an exit electrode plate 15 provided with an exit aperture 17.

According to a first way of carrying out the internal ion filtering, the filtering means associated with the or each additional intermediate node 9 may consist of at least one calibrated passage 10 in a physical barrier 10', said passage 10 being centered on an intermediate node 9, such as for example an aperture 10 in a plate 10' arranged transversally, preferably perpendicular, to the center axis 6 within the tubular volume 2', or within a longitudinal segment 2" of said composite volume 2' of the QMF device 2, said plate(s) 10' extending radially also between the successive adjacent or separated rod segments 7, 7', if the case occurs.

The aperture 10 is typically of a circular shape, but can also be polygonal-shaped, such as square or rectangular.

According to a second way of carrying out the internal ion filtering, the filtering means associated with the or each additional intermediate node 9 may comprise at least one unstable motion region or region of variable stability 10 inside which the local electrical field features impart unstable or at least altered trajectories to every ion going through said region 10, said at least one intermediate node 9 being located, preferably centrally, within said at least one unstable motion or variable stability region 10.

The QMF device 2 may be unitary with homogenous (continuous) rods 3, 3' (FIGS. 8A, 8B, 25 and 26) or segmented ones (FIGS. 13 to 16, 23 and 24).

Now, the QMF device 2 may also be composite and comprise at least two separate quadrupole mass filter units, mutually aligned and assembled longitudinally end-to-end, or with at least one focusing means 19, 20 interposed between them, each unit having its own entrance 4 and exit 5 or sharing its entrance and/or exit with an other unit, the filtering of the ion beam 1' being performed by the mutually facing separate or coinciding entrance and exit apertures 16, 17 of the successive quadrupole mass filter units (FIGS. 3 to 7).

According to a first embodiment, each of the rods 3, 3' of at least one pair of rods may be segmented and made of physically separated segments 7 (preferably at least three) mutually aligned in a direction parallel to the longitudinal center axis 6, the or each unstable motion region 10 being preferably achieved by increasing $U_{DC}$ or by decreasing $V_{RF}$ of the concerned opposed segments 7.

According to a second embodiment, each of the rods 3, 3' of at least one pair of rods may be segmented and consists of a rod having at least two longitudinal segments 7 showing distances $r_O$, $r_{O-}$, $r_{O+}$ to the longitudinal center axis 6 which are different.

More precisely, each rod can comprise segments 7 of different diameters, in particular at least two neighboring segments having diameters $d_-$, $d_+$ which are different from the current diameter d of the rod 3, 3', and said at least two neighboring segments having greater or smaller diameters being located in an area where an unstable motion region 10, or at least a region of variable stability, is to be achieved.

Alternatively, the device 2 may comprise, as means to create and maintain an unstable motion region or region of variable stability 10, a pair of opposed DC electrodes 26, 26' aligned in the planes of symmetry of the arrangement of rods 3, 3' of the QMF device 2, i.e. along the concurrent bisector planes of the first and second transverse planes HO and VE (FIGS. 25 and 26).

As can be seen on the enclosed figures, the continuous or segmented rods 3, 3' extend, for the sole or each quadrupole mass filter unit, from an entrance electrode 14 to an exit electrode 15, comprising respectively an entrance aperture 16 and an exit aperture 17 centered on the quadrupole center axis 6, for example square or diamond-shaped or circular cylindrical or conical apertures, the exit and entrance electrodes 14, 15 of respectively two successive QMF units being separate or coinciding.

In view of shaping and discriminating advantageously the entering and/or exiting ion beam(s), and in relation to a practical construction of the invention, at least one of the electrode apertures 16, 17 is shaped as a portion of a cone extending from an apex, located inside the device 2, on the quadrupole longitudinal center axis 6, to a base corresponding to the quadrupole entrance 4 or to the quadrupole exit 5.

Finally, the invention also encompasses as shown by way of example on FIG. 13A, a scanning or filtering device 21 able to perform the method of filtering an ion beam and to perform the scanning method as described herein before.

Figure 3A:
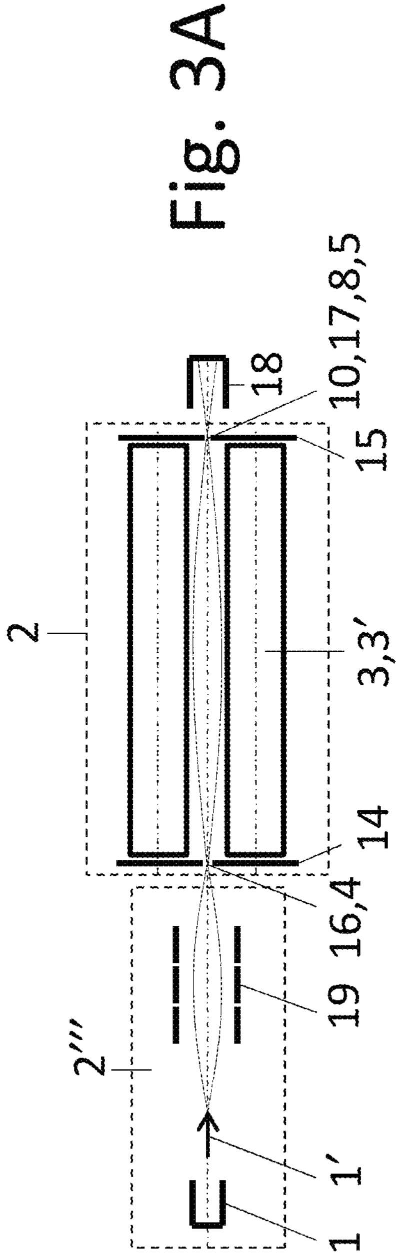
FIGS. 3A to 3D are schematic longitudinal sectional views along the HO plane or the VE plane respectively of a quadrupole mass filter device (QMF device) according to four different constructions of a first embodiment of the invention, said device being able to perform the filtering and scanning methods according to the invention.
Figure 3B:
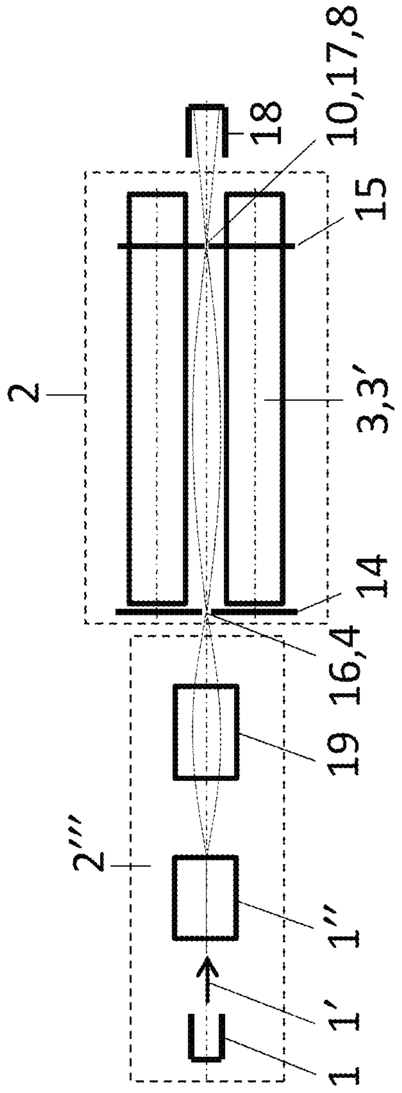
Figure 3C:
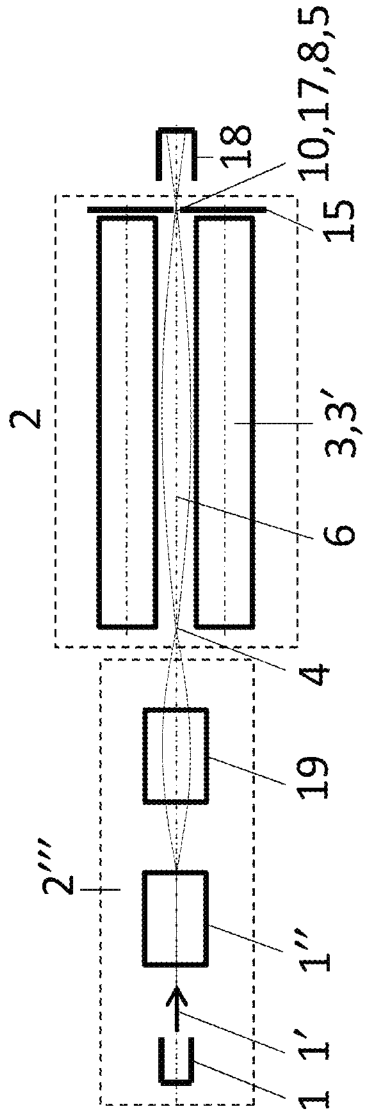
Figure 3D:
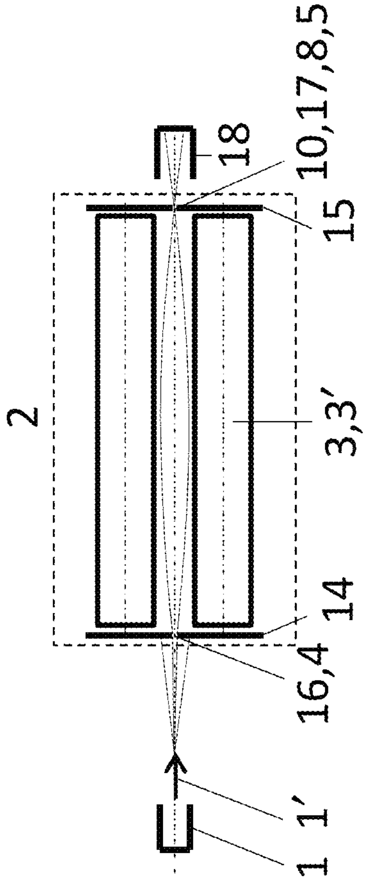

This scanning or filtering device 21 comprises essentially, as shown on FIG. 3A:

- a quadrupole mass filter device 2, as described herein before,
- an ion source 1 able to emit an ion beam 1' towards the device 2,
- means 1", 16, 19 to configure said ion beam 1' before it enters the tubular inside volume 2' of the QMF device 2, said beam 1' being configured so as to have a limited radial dimension at least at the level of the entrance 4 and to be directed along the longitudinal center axis 6, said beam being preferably aimed and focused at the quadrupole entrance 4, namely at the entrance aperture 16 of the entrance electrode 14 of the device 2,
- means 21' to apply an adjustable ion acceleration potential $U_{ACC}$ between the ion source 1 and the quadrupole entrance 4,
- an ion sensor 18, for instance a Faraday cup, able to emit a signal which is proportionate to the number of ions entering or impacting said sensor 18 during a given time period (the sensor 18 is located beyond the exit 5 of the device 2).

More precisely, the scanning or filtering device 21 schematically shown on FIG. 13A, mainly comprises the following parts, components and accessory equipments:

- an ion source 1, connected to a DC bias 21' (for the definition of $U_{ACC}$) and a power source and associated with a focusing element (Ion-gun—first focusing lens 19), said ion source 1 producing an ion beam 1',
- a QMF device 2 with segmented rods 3, 3' mounted on a support structure 3" inside a cylindrical enclosure electrode 23 (defining the main DC offset of the QMF and acting as a Faraday cage), said device 2 comprising entrance and exit electrodes 14 and 15 with respective apertures 16, 17, and having at least one internal unstable motion region 10,
- precision DC potential supplies 22 and precision RF devices 22' (for example: resonating circuit or oscillator+amplifier) able to generate and to adjust the electrical fields between the segments 7 of the rods 3, 3',
- a focusing lens 20 followed by an ion sensor or position sensitive TOF detector 18, connected to a counter, an oscilloscope or a similar display device 18',
- a vacuum housing 24 lodging the QMF device 2 and connected to a vacuum generating equipment 25.

Advantageously, said beam configuration means comprise a first focusing lens 19, for instance an Einzel lens, located between the ion source 1 and the quadrupole entrance 4 and centered on the quadrupole center axis 6, able to focus an ion beam 1' originating from the ion source 1 precisely on the quadrupole center axis 6 at the quadrupole entrance 4.

Said scanning device 21 also comprises a second focusing lens 20, located between the quadrupole exit 5 and the ion sensor 18 and centered on the quadrupole center axis 6, said second lens 20 being able to focus an ion beam exiting from said quadrupole exit 5 on said ion sensor 18.

It may also be envisaged that said beam configuration means comprise an energy selector, interposed between the ion source 1 and the quadrupole device entrance 4, such as a deflector or a Wien filter, said energy selector 1" being configured to allow only ions having a given range of kinetic energies to enter the quadrupole device 2.

The main principles, features and properties of the invention have been experimentally tested by the inventor by way of simulation using SIMION® (by Scientific Instrument Services) software package to emulate given QMF devices 2, said software allowing the user to adjust the main QMF parameters during the simulation and to visualize immediately the resultant EM fields and ion trajectories.

The QMF device models experimentally simulated corresponds to a device as shown in FIG. 13B or 13C, i.e. a QMF device 2 comprising a QMF with segmented rods 3, 3' (each rod 3, 3' having three segments 7: a short central one and two longer side ones/each rod 3, 3' having nine short identical segments 7), an entrance (Einzel) focusing lens 19, an exit (Einzel) focusing lens 20 and an ion source 1.

The main dimensions of the simulated QMF models are listed in the below table:

| | |
|---|---|
| RF rod length | 360 mm |
| Long RF segment | 160 mm |
| Short RF segment(s) | 40 mm |
| RF rod radius (r) | 11.28 mm |
| Distance RF rod - beam axis ($r_0$) | 10.0 mm |
| Entrance aperture diameter | 2 ÷ 4 mm |
| Exit aperture diameter | 0.5, 1.0, 2.0 mm |
| Number of RF segments, two versions | 9 short or 3 mixed |

Figure 18:
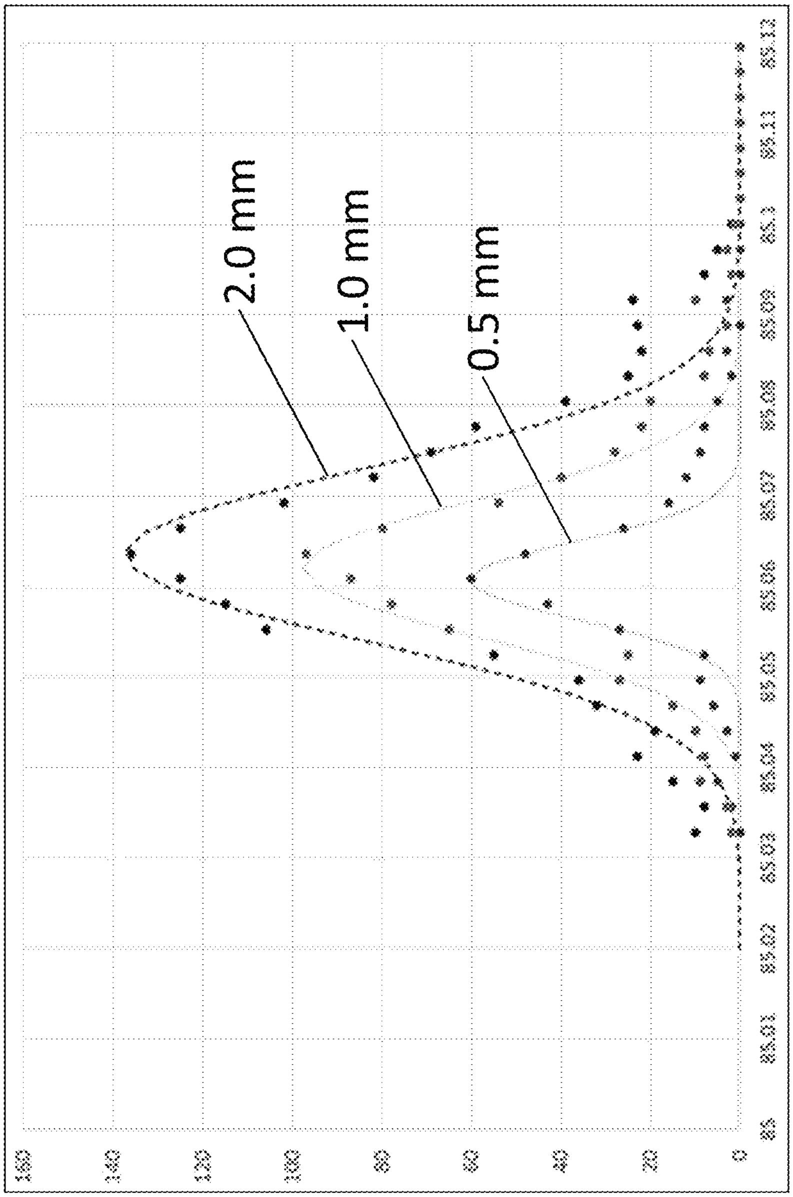

The initial beam properties in SIMION are defined by a mass range (uniform distribution) and initial coordinates, angles, and kinetic energy (3D Gaussian distributions). The applied settings are noted and the results from the simulation are saved as particle distributions including information about each ion, i.e. ion mass, extraction coordinates, velocities and kinetic energy. The distributions are analyzed allowing Gaussian fits on the mass distributions in order to estimate the mass resolution. The efficiencies are defined by the transmission of the particles at the central mass. FIG. 18 shows the analysis of a typical SIMION output (EF+UMR) with normal distribution fits for the three different aperture sizes (0.5 mm, 1 mm, and 2 mm). The results from the fit in this example are shown in the table below:

| | 0.5 mm aperture | 1.0 mm aperture | 2.0 mm aperture |
|---|---|---|---|
| Mass resolution (FWHM) | 8400 | 4816 | 3763 |
| Transmission efficiency [%] | 6.4 | 8.6 | 12.7 |

The QMF models with longitudinal segmentation were used in the simulations also in standard operation mode in order to estimate the increase of the performance of the enhanced operation modes.

Figure 19:
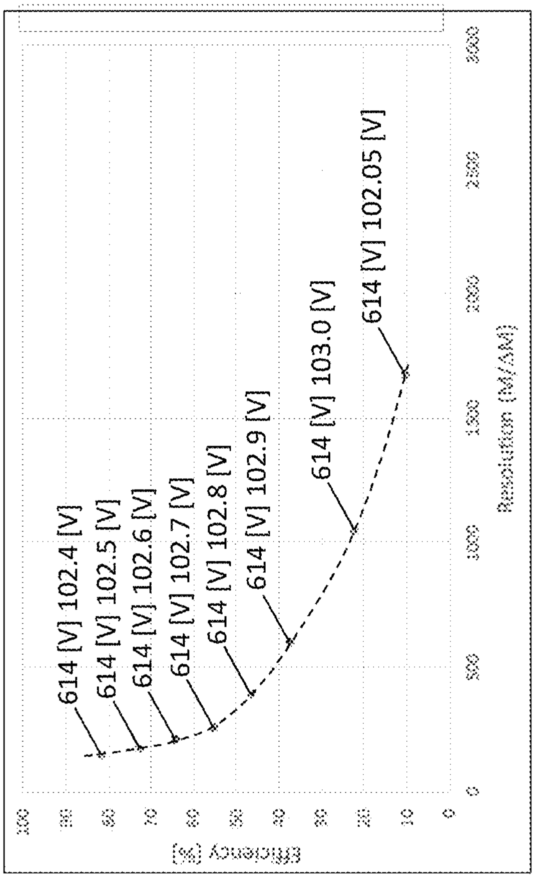

The graphic of FIG. 19 shows the relation between transmission efficiency and mass resolution for ion mass 85, beam size of 0.47 mm (rms) and divergence of 2.4 deg (rms) and an energy spread of 0.314 eV (FWHM).

Figure 17:
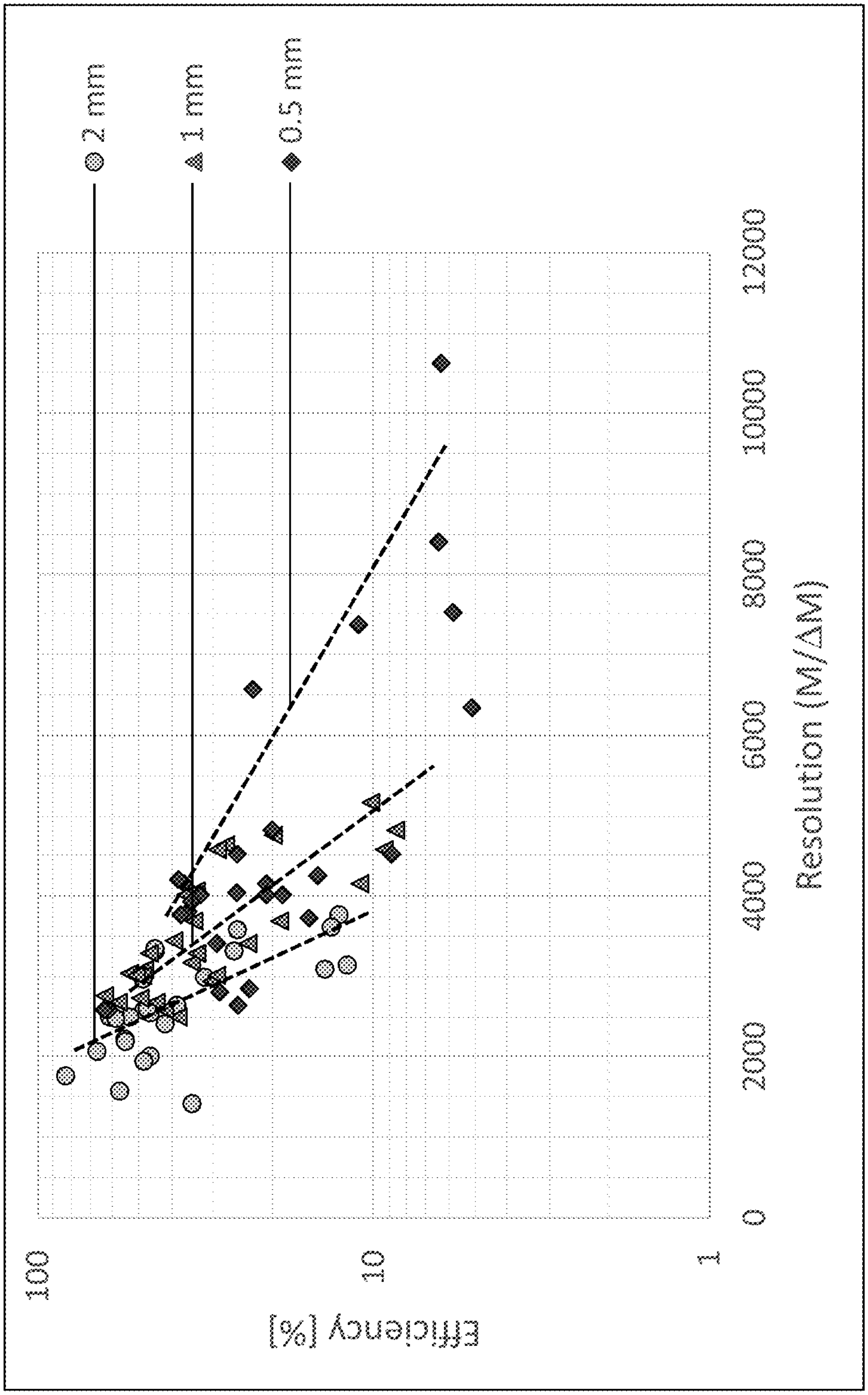
FIGS. 17 to 21 are other graphics showing simulation efficiency/resolution results.

The graphic on FIG. 17 shows the same relation for the same ion beam when applying EF and UMR for a large variety of QMF tunings. The comparison of the two FIGS. (17 and 19) shows the expected increase of performance based on the simulations.

When considering the method according to the invention, the man skilled in the art easily understands that the tuning of the QMF for achieving EF and UMR is more complex than the standard operation mode. The procedure starts by adjusting the RF and the DC potentials for an ion reference mass according to a standard QMF operation, i.e. near the tip of the stability diagram. At this starting point the transmission efficiency should still be high whereas a high mass resolution will not be reached yet.

The next step is to perform a fine scan of several RF and DC parameters: RF frequency $F_{RF}$ and amplitude $V_{RF}$, DC potential on QMF $U_{DC}$ and accelerating potential $U_{ACC}$. The latter defines the kinetic energy, thus also the longitudinal velocity of the reference ions. During the scan one should read the ion current on a Faraday cup FC 18 situated downstream the exit aperture 17 of the QMF. The first parameter to scan is the potential $U_{ACC}$. During the scan multiple peaks will be observed at the FC. These peaks will correspond to focusing of the ions at the position of the exit aperture. The focusing distances for a given set of parameters $F_{RF}$, $V_{RF}$ and $U_{DC}$ will be different in the two transverse planes HO and VE, thus there will be separate peaks corresponding to both horizontal HO and vertical VE focusing (the two transverse planes are defined as horizontal and vertical by the sign of $U_{DC}$). The number of measured current peaks will depend on the $U_{ACC}$ scanning range. The reason for that is that these peaks correspond to different nodes of the oscillations of the ions trajectories in both transverse directions. When the nodes positions correspond to the position of the QMF exit aperture 17 there will be an ion current peak at the detector 18. The grouped oscillations of the ions can be adjusted to fit multiple half periods within one $U_{ACC}$ scan (consider the various rows of FIG. 14).

In the simulation one can notice the trajectory oscillations in each of the transverse planes, but in practice it is necessary to determine which peaks correspond to HO and which ones to VE focusing. This is done by varying $F_{RF}$ and/or $V_{RF}$ in steps and then performing a $U_{ACC}$ scan for each setting. These two parameters influence the positions of the nodes in both transverse planes but in opposite directions. The latter means that when $F_{RF}$ is increased the focusing distances are increased in the first transverse plane and simultaneously decreased in the second. The same is also true for $V_{RF}$ but the dependence is reversed, i.e. when $V_{RF}$ is increased the focusing distance in the first plane will be decreased whereas in the second plane it will be increased.

After peak identification, one can fine-tune $F_{RF}$ and $V_{RF}$ for matching the oscillation nodes in both planes. In these cases, double-plane focusing, i.e. exact focusing (EF), is achieved and the ion transmission is highly increased for the given combination of parameters. There are various combinations of oscillation nodes that can be used for the operation of the QMF. The positions of the nodes are strongly mass (q/m) dependent in both transverse planes. This dependence allows using EF for additional selectivity at the exit aperture, thus reaching a higher mass resolution. The table below summarizes the dependence of the focus distance in each transverse plane on various parameters.

| Parameter | HO focal distance | VE focal distance |
|---|---|---|
| $U_{ACC}$ | + | + |
| $V_{RF}$ | − | + |
| $F_{RF}$ | + | − |
| $U_{DC}$ ($U_{DC1}$, $U_{DC2}$, etc.) | + | + |
| Ion mass (constant charge) | + | − |

Figure 20:
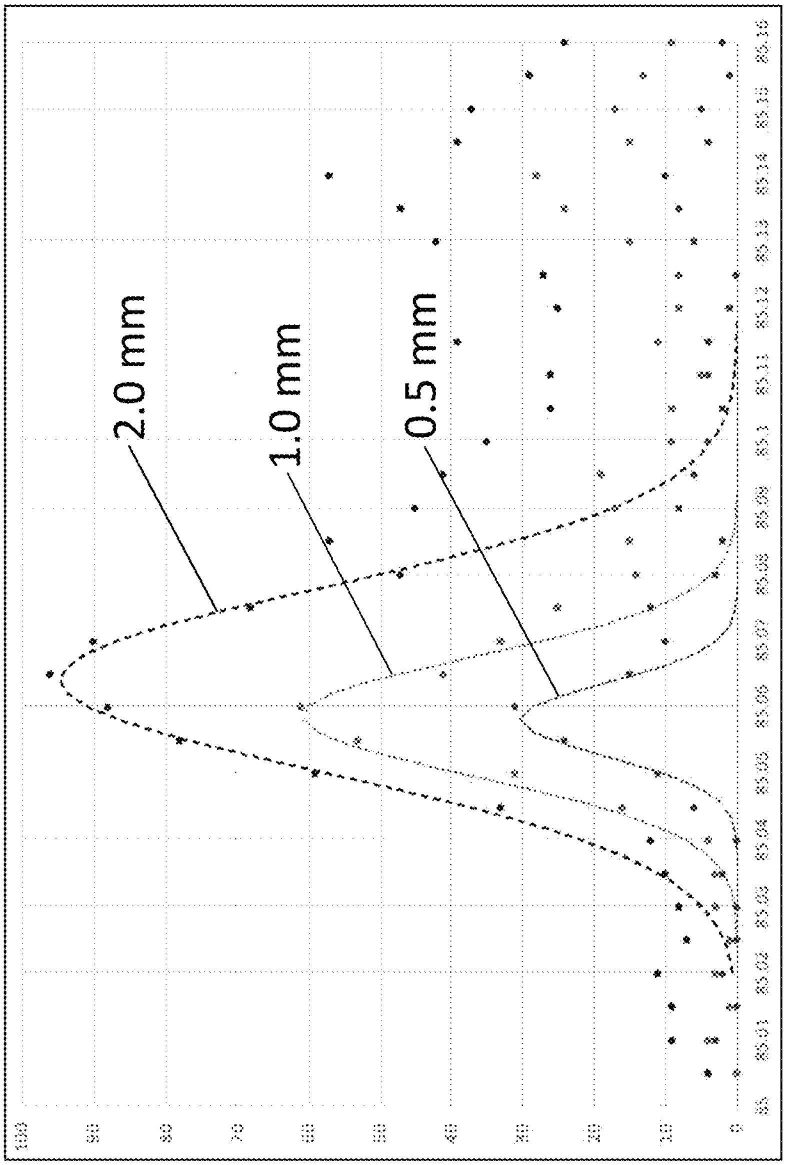

The tuning of the EF for a high mass resolution is simplified by using the segmented structure of the RF rods 3, 3'. It allows adjusting the RF and DC parameters differently along the QMF length. In EF operation the most convenient parameter to vary along the QMF is $U_{DC}$. Varying $U_{DC}$ allows to increase smoothly the Mathieu parameter a after the ion entry into the QMF, which can be used to obtain a stronger ion confinement at the entrance of the QMF, thus increase the transmission efficiency for the given ion mass range. A fine-tuning of the main parameters ($U_{ACC}$, $V_{RF}$, $F_{RF}$) is necessary in order to compensate for the modification of parameters $U_{DC1}$, $U_{DC2}$, $U_{DC3}$, etc. The procedure is done the same way as the previous standard EF tuning, i.e. by matching the ion oscillation nodes in the two transverse planes. FIG. 20 illustrates an example of a QMF mass spectrum obtained by applying EF only. The FWHM mass resolution is rather high but there are tails of higher masses (more prominent for larger apertures).

Figure 21:
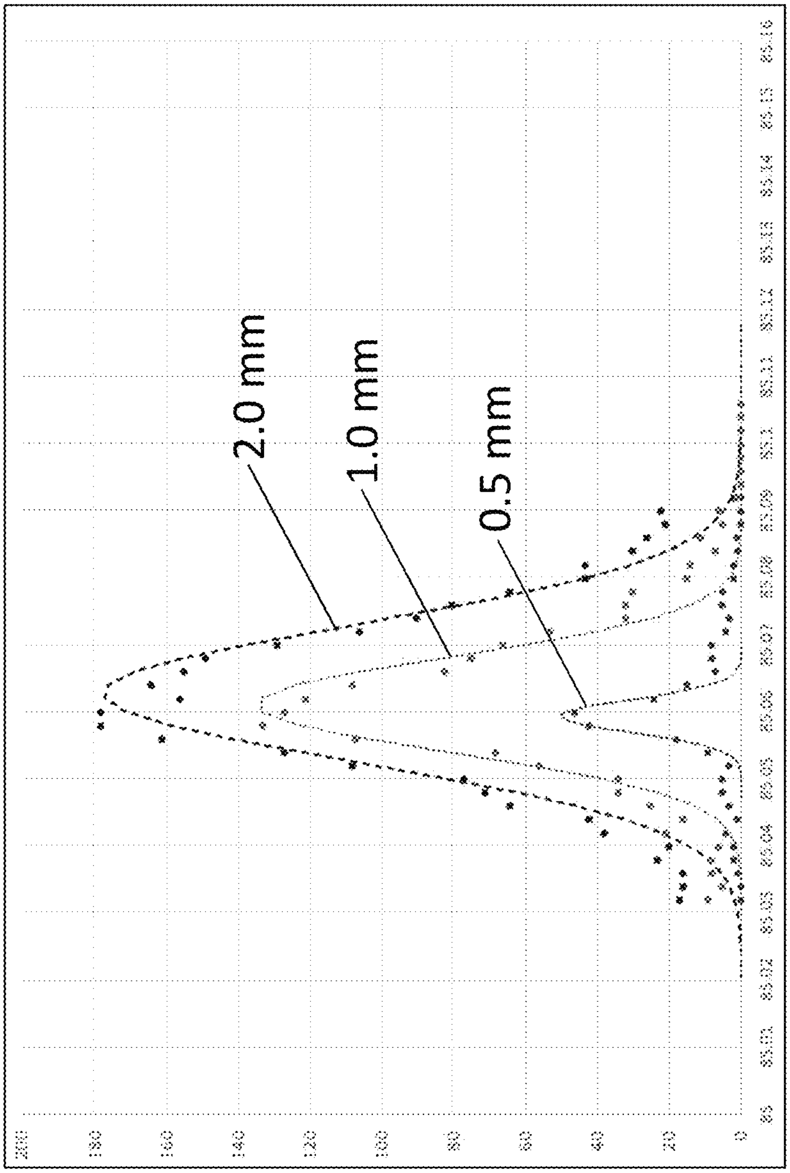

As provided for by the invention, the use of at least one unstable motion region (UMR) 10 is the other enhancement to the QMF performance, which makes use of the segmentation of the RF rods 3, 3', and which increases further the mass resolution obtained by EF when combined with the latter. Unstable motion regions can be defined for all ion masses by applying locally a high $U_{DC}$ (for $a>0.237$). The ion motion in the UMR will be unstable for all ion masses, but in a combination with a matched oscillation node in the vicinity of the center of the UMR segment, one can contain the reference mass ions within the QMF until they reach the subsequent stable region, whereas the ions with different masses will not be focused correctly leading to the increase of their oscillation amplitudes and their subsequent loss. An example of UMR operation can be set by applying 2× HO and 2× VE nodes, thus introducing a node in the center of the QMF for both transverse directions. Then one can create an UMR 10 by applying appropriate $U_{DC}$ potentials on the middle segment of the QMF. FIG. 21 is for the highest mass resolution achieved so far (for 0.5 mm aperture). This solution is based on the EF settings from the example of FIG. 20. The mass resolution and high mass tails are highly reduced when using EF/UMR combination.

Of course, in practice, the fine tuning of the QMF parameters may be achieved in an easy and fast way due to the immediate observation of the ion currents measured at the ion detector or sensor 18 arranged axially after the exit aperture 17.

Other setting parameters which influence the transmission efficiency and/or the mass resolution of the QMF device 2 comprise mainly: the initial beam emittance, the quality and features of the beam focusing at the entrance 4 of the QMF device 2 (focusing adjustment performed by applying different settings at the ion source 1 and at the entrance lens 19), the compensation of possible mechanical offsets and/or constructive imperfections of the rods 3, 3' and the quality of the frequency and amplitude stability of the AC potentials.

After a fine-tuning procedure for exact focusing (EF) at the exit aperture 17, a high-resolution mass scan can be performed with the QMF device. Unlike in the standard operation, where only $V_{RF}$ and $U_{DC}$ are typically scanned, in the EF and UMR modes according to the invention there is also the necessity to preserve the node 8, 9 positions during the scan. The reason for the latter is that, unlike a scan in standard operation, where one preserves only the Mathieu parameters, typically by only adjusting $V_{RF}$ and $U_{DC}$ simultaneously, in EF mode the focal distance has an opposite dependence (−/+) on $V_{RF}$ in the two transverse planes, but $U_{DC}$ affects the focal distances similarly (+/+) in the two transverse planes. Thus, one needs to vary more/other parameters in such a way that the node positions will be preserved along the beam axis 6.

There are several different schemes to perform a mass scan while preserving the Mathieu parameters and the node positions in both transverse planes. The two simplest ones are introduced below.

The first one (a) involves a frequency ($F_{RF}$) scan only. All other parameters ($V_{RF}$, $U_{DC}$, $U_{ACC}$) can be fixed. The mass range during the scan can be very large without affecting the mass resolution. The operating principle of this scan scheme is very simple. As one can see in the previous Table, the similar dependencies of ion mass (+/−) and $F_{RF}$ (+/−) allow preserving the node positions. From the equations set forth at the beginning one can see that the Mathieu parameters a and q will be also preserved simultaneously due to the same a and q dependence on the ion mass M and the square of the frequency $F_{RF}^2$. This scan scheme is the preferred one based on the simulation results, but it may be more difficult to implement due to the required amplitude precision of the RF supply during the frequency sweep.

The second scan scheme (b) involves a continuous readjustment of the ion kinetic energies (thus velocities) by including the parameter $U_{ACC}$ into a $U_{DC}$ & $V_{RF}$ scan. In this scheme the frequency $F_{RF}$ is fixed during one scan. The implementation of this scheme is simple, but the mass range is limited for a given fixed frequency. This is due to the acceleration of the ions, which need to pass through the fixed length of the QMF. The mass resolution is affected when the velocities of the ions are increased a lot. In order to avoid resolution degradation when performing a large mass range, one needs to switch $F_{RF}$ to other fixed frequencies (in steps) and repeat the initial $U_{DC}$ & $V_{RF}$ scan starting at low $U_{ACC}$ values. This scan scheme is a little more complex but, unlike scheme (a), the frequency is not changed continuously but in steps, which may be easier to implement in the RF electronics while preserving the required high precision of $V_{RF}$.

A more complex, scanning scheme can be applied if one uses a combination of the two schemes described above. An example is the $U_{DC}$ & $V_{RF}$ ramping scan (scheme a) in combination with a smooth $F_{RF}$ reduction (scheme b). This third scheme can be used for reaching high masses without a large reduction of the RF frequency, as one requires in scheme (a).

Of course, the invention is not limited to the embodiments described and represented in the accompanying drawings. Modifications remain possible, particularly from the viewpoint of the composition of the various elements or by substitution of technical equivalents without thereby exceeding the field of protection of the invention.

The invention claimed is:

1. A method of filtering an ion beam to isolate ions having a targeted charge to mass ratio, said method comprising:

providing a quadrupole mass filter device comprising four, continuous or segmented, rods, extending parallel to each other from a quadrupole entrance to a quadrupole exit, said rods being arranged symmetrically and regularly around an axis forming a quadrupole longitudinal center axis and defining between them a continuous or segmented tubular volume, said rods being furthermore arranged opposite two by two in respectively a first transverse plane and a second transverse plane, perpendicular to each other, said method also comprising the steps of:

emitting an ion beam towards the entrance of said quadrupole mass filter device, said ion beam being configured by shaping and/or pre-filtering means so as to have a limited radial dimension at least at the level of the entrance and to be directed along the longitudinal center axis of said device, applying an electrical field between the rods or rod segments of each pair of opposite rods, each field being defined by combined direct and alternative potentials, allowing ions having a charge to mass ratio in a given value range, defining a stability range, to oscillate ions within the lateral limits of the tubular volume or consecutive volume segments when the ion beam moving through the quadrupole, in both the first and second transverse planes, and to exit said device, and calibrating each of the electrical fields by adjusting the amplitudes of their DC potentials and the amplitudes and frequencies of their AC potentials, and also by adjusting the velocity of the ions entering the quadrupole, in order to create at least one oscillation node or exact focusing point where the oscillation patterns of the ions having said targeted charge to mass ratio, in both transverse planes, substantially and simultaneously cross the quadrupole center axis at a same given point, said node or one of said nodes, called sole or exit node, being located at or proximate to the exit of the device.

2. The method of filtering of claim 1, wherein said ion beam, provided by a corresponding source, is passed through a calibrated entrance aperture, preferably belonging to an entrance electrode located at or proximate to the quadrupole entrance, which shapes and/or filters said beam before it enters the tubular volume.

3. The method of filtering of claim 1, wherein said ion beam, emitted by a corresponding source, is preconditioned before entering the tubular volume through the quadrupole entrance, having a radial size, ion energy and/or direction of travel and wherein the preconditioning of the ion beam comprises at least focusing said beam near or close to, preferably at, the quadrupole entrance.

4. The method of filtering of claim 1, further comprising calibrating the electrical fields in order to create in addition a first node located at the exit of the device, at least one other node or exact focusing point, called intermediate node, located between the entrance and the exit of the device, filtering the ion beam in the vicinity of and at said at least one intermediate node location, through a physical or field based filtering means, said filtering means allowing most of the ions having the targeted charge to mass ratio to cross said location and to continue their downstream movement towards the exit, the other ions being blocked or caused to collide with one of the rods.

5. The method of filtering according to claim 4, wherein the filtering of the ion beam is performed by creating and maintaining at least one unstable motion region or region of variable stability within the tubular volume, or within at least one segment of a composite volume, of the QMF device, said filtering means being thus formed by region(s) resulting from modification(s) of the local electrical fields.

6. The method of filtering according to claim 5, wherein the step of creating and maintaining an unstable motion region or region of variable stability is carried out by increasing the DC potential applied to each segment surrounding said region, said increase of the DC potential being selected by taking into account the length of the unstable motion region, determined by the segmentation configuration of the rods, so that most ions having said targeted charge to mass ratio are able to cross said region and to return to a stable, radially confined oscillation and continue their downstream movement towards the exit.

7. The method of filtering of claim 4, wherein the filtering of the ion beam is performed by creating and maintaining at least one unstable motion region or region of variable stability within the tubular volume, or within at least one segment of a composite volume, of the QMF device, said filtering means being thus formed by region(s) resulting from modification(s) of the local electrical fields, and wherein the steps of formation of the local electrical fields, formation of at least two focusing nodes and formation of at least one field based filtering means consist in generating, by means of rods which are segmented longitudinally or have a segmented structure in their longitudinal direction, an electrical field extending between and along each pair of segmented rods, which comprises several local electrical field segments having their specific calibration settings for the DC and/or the AC potential(s) and corresponding to the respectively mutually opposed segments of the segmented rods, calibrating said local field segments by adjusting the settings of their respective individual DC and AC potentials in order to create at least one other node or exact focusing point, called intermediate node, located between the entrance and the exit of the device, the at least one intermediate node being substantially located in the center of one of the local electrical field segments, creating and maintaining an unstable motion region or region of variable stability in the vicinity of and at said at least one intermediate node location, by modifying the settings of the local electrical fields applied to the rod segments surrounding said region, in order to impart unstable or at least altered trajectories to every ion passing through said region, the length of said unstable motion or variable stability region being set so that most ions having said targeted charge to mass ratio are able to cross said region, to return to a stable oscillation and continue their downstream movement towards the exit.

8. The method of filtering according to claim 1, wherein a final filtering operation of the ion beam is performed in the vicinity of and at said exit node through an exit electrode plate provided with a calibrated exit aperture.

9. The method of filtering according to claim 1, wherein initial calibration of the electrical fields, in order to obtain any of the oscillation nodes and settings of the device for a given ions mass, is performed by:

adjusting the parameters of the electrical fields so that the Mathieu parameters of ions having a given mass to charge ratio are located within and near the tip of a first stability region of the Mathieu stability diagram, measuring the distance between a set of half focusing nodes of said ions, corresponding to nodes of one of the transverse oscillation patterns of said ions, by ranging an acceleration potential which determines the velocity of the ions at the entrance of the device and measuring the variation of the number of ions exiting the quadrupole while crossing the quadrupole center axis, ascertaining that a given half focusing node corresponds to a node of one of the transverse oscillation patterns of said ions by iteratively varying the frequency and/or the amplitude of the AC potential of the concerned electrical fields and by ranging each time the ion acceleration potential to measure an offset in the distance between said half focusing nodes, merging the position of half focusing nodes originating from one transverse oscillation pattern with half focusing nodes originating from the other transverse oscillation pattern by iteratively varying the frequency and the amplitude of the AC potential of the electrical field and checking the position of the half focusing nodes by ranging the acceleration potential, thus creating at least two oscillation nodes corresponding to points or approximately punctual locations where a simultaneous focusing in both transverse planes occurs, one node being located at the exit of the device and at least one other node being located between the entrance and the exit of said device.

10. The method of filtering according to claim 1, wherein each of the segmented rods of at least one pair of rods consists of a rod having at least two longitudinal contiguous segments showing distances to the longitudinal center axis which are different.

11. The method of filtering according to claim 1, wherein the location(s) of the node(s) is(are) adjusted by modifying the parameters of the local electrical fields and/or the acceleration potential, as the potential difference between the ion source and an electrode at the entrance of the device.

12. A quadrupole mass filter device, able to perform the method of filtering an ion beam according to claim 1, said device comprising:

four identical, advantageously cylindrical or hyperbolical, continuous or segmented rods, extending mutually in parallel from an quadrupole device entrance to a quadrupole exit, respectively associated with an entrance aperture and an exit aperture, said rods being arranged symmetrically and regularly around an axis forming a quadrupole center axis and defining between them a continuous or segmented tubular volume, said rods being furthermore arranged two by two in respectively a first transverse plane and a second transverse plane, perpendicular to each other, means to apply specific local electrical fields, defined by combined direct and alternative potentials, between each pair of mutually opposite rods or rod segments of the two pairs of rods, said local fields forming together a composite electrical field along the tubular volume or aligned volume segments, which allows ions having a charge to mass ratio in a given ratio value, defining a stability range, to oscillate within the lateral limits of the tubular volume, or consecutive volume segments, when moving through the quadrupole in both the first and second transverse planes and to exit said quadrupole device, means to adjust the amplitudes of the DC potentials and the amplitudes and frequencies of the AC potentials, means to adjust an acceleration potential designed for providing the ions of an incident beam with a given kinetic energy or velocity before their passage through the entrance of the quadrupole device, wherein said local electric fields are configured and tuned and said acceleration voltage is set, so that at least one oscillation node or exact focusing point is created where the oscillation patterns of the ions having a targeted charge to mass ratio, in both transverse planes, substantially and simultaneously cross the quadrupole center axis at a same point, said node or one of said nodes, called sole or exit node, being located at or proximate to the exit of the device.

13. The quadrupole mass filter device according to claim 12, wherein said local electrical fields are configured and tuned and said acceleration voltage is set, so that at least two oscillation nodes or exact focusing points are created where the oscillation patterns of the ions having a targeted charge to mass ratio, in both transverse planes, substantially and simultaneously cross the quadrupole center axis at a same point, said nodes comprising:

one oscillation node or exact focusing point located at the exit of the device;

at least one other intermediate oscillation node or exact focusing point located between the entrance and the exit of the device, and wherein filtering means are provided, in the vicinity of and at said at least one intermediate node, in order to filter the ion beam, said filtering means being either physical or field based means and being arranged and configured so as to allow most of the ions having the targeted charge to mass ratio to cross said location and to continue their downstream movement towards the exit, the other ions being blocked or caused to collide with one of the rods.

14. The quadrupole mass filter device according to claim 13, wherein the filtering means associated with the each intermediate node comprise at least one unstable motion region or region of variable stability inside which the local electrical field features impart unstable or at least altered trajectories to every ion going through said region, said at least one intermediate node being located within said at least one unstable motion region or region of variable stability.

15. The quadrupole mass filter device according to claim 12, wherein the ion beam filtering means associated with the first or exit node consists of a physical filtering means as an exit electrode plate provided with an exit aperture.

16. The quadrupole mass filter device according to claim 12, further comprising at least two separate quadrupole mass filter units, mutually aligned and assembled longitudinally end-to-end, with at least one focusing means interposed between them, each unit having its own entrance and exit or sharing its entrance and/or exit with another unit, the filtering of the ion beam being performed by the mutually facing separate or coinciding entrance and exit apertures of the successive quadrupole mass filter units.

17. The quadrupole mass filter device according to claim 12, wherein each of the rods of at least one pair of rods is segmented and made of at least three, physically separated segments mutually aligned in a direction parallel to the longitudinal center axis, the each unstable motion region being achieved by increasing direct current potential or by decreasing radio frequency potential of the concerned opposed segments.

18. The quadrupole mass filter device according to claim 12, wherein the rods extend from an entrance electrode to an exit electrode, comprising respectively an entrance aperture and an exit aperture centered on the quadrupole center axis square or diamond-shaped or circular cylindrical or conical apertures, the exit and entrance electrodes of respectively two successive quadrupole mass filter units being separate or coinciding.

19. A filtering device able to perform the method of filtering an ion beam according to claim 1 comprising:

a quadrupole mass filter device comprising:

four identical, advantageously cylindrical or hyperbolical, continuous or segmented rods, extending mutually in parallel from an quadrupole device entrance to a quadrupole exit, respectively associated with an entrance aperture and an exit aperture, said rods being arranged symmetrically and regularly around an axis forming a quadrupole center axis and defining between them a continuous or segmented tubular volume, said rods being furthermore arranged two by two in respectively a first transverse plane and a second transverse plane, perpendicular to each other, means to apply specific local electrical fields, defined by combined direct and alternative potentials, between each pair of mutually opposite rods or rod segments of the two pairs of rods, said local fields forming together a composite electrical field along the tubular volume or aligned volume segments, which allows ions having a charge to mass ratio in a given ratio value, defining a stability range, to oscillate within the lateral limits of the tubular volume, or consecutive volume segments, when ions moving through the quadrupole in both the first and second transverse planes and to exit said quadrupole device, means to adjust the amplitudes of the DC potentials and the amplitudes and frequencies of the AC potentials, means to adjust an acceleration potential designed for providing the ions of an incident beam with a given kinetic energy or velocity before their passage through the entrance of the quadrupole device, wherein said local electric fields are configured and tuned and said acceleration voltage is set, so that at least one oscillation node or exact focusing point is created where the oscillation patterns of the ions having a targeted charge to mass ratio, in both transverse planes, substantially and simultaneously cross the quadrupole center axis at a same point, said node or one of said nodes, called sole or exit node, being located at or proximate to the exit of the device, an ion source able to emit an ion beam towards the device, means to configure said ion beam before it enters the tubular inside volume of the QMF device, said beam being configured so as to have a limited radial dimension at least at the level of the entrance and to be directed along the longitudinal center axis, said beam being aimed and focused at the quadrupole entrance, at the entrance aperture of the entrance electrode of the device, means to apply an adjustable ion acceleration potential between the ion source and the entrance of the quadrupole mass filter device, an ion sensor as a Faraday cup or an electron multiplier, able to emit a signal which is proportionate to the number of ions entering or impacting said sensor during a given time period, said sensor being located beyond the exit of the quadruple mass filter device.

20. Filtering device according to claim 19, wherein said beam configuration means comprise a first focusing lens as an Einzel lens, located between the ion source and the quadrupole entrance and centered on the quadrupole center axis, able to focus an ion beam originating from the ion source precisely on the quadrupole center axis at the quadrupole entrance.

* * * * *